United States Patent [19]

Eccleston et al.

[11] Patent Number: 4,634,975

[45] Date of Patent: Jan. 6, 1987

[54] METHOD AND APPARATUS FOR PRODUCING ELECTROMAGNETIC SURVEILLANCE FIELDS

[75] Inventors: Larry Eccleston; James C. Cook, II, both of Marshall; Earl R. Goodrich, II, East Lansing, all of Mich.

[73] Assignee: Progressive Dynamics, Inc., Marshall, Mich.

[21] Appl. No.: 651,576

[22] Filed: Sep. 17, 1984

[51] Int. Cl.[4] ....................... G08B 13/24; G01R 33/00

[52] U.S. Cl. .................................... 324/232; 324/243; 340/572; 361/152

[58] Field of Search ............... 324/207, 228, 232, 233, 324/234, 239, 243; 340/551, 572; 361/152, 180

[56] References Cited

U.S. PATENT DOCUMENTS

| | | | |
|---|---|---|---|
| 3,665,449 | 5/1972 | Elder et al. | 340/572 |
| 3,740,742 | 6/1973 | Thompson et al. | 340/572 |
| 3,758,849 | 9/1973 | Susman et al. | 340/551 X |
| 4,300,183 | 11/1981 | Richardson | 340/572 X |
| 4,309,697 | 1/1982 | Weaver | 340/551 X |
| 4,467,281 | 8/1984 | Davis et al. | 324/232 |
| 4,519,066 | 5/1985 | Barrett, Jr. et al. | 340/572 X |

*Primary Examiner*—Gerard R. Strecker

*Attorney, Agent, or Firm*—Price, Heneveld, Cooper, DeWitt & Litton

[57] ABSTRACT

Methods and apparatus for producing alternating electromagnetic fields for use in theft detection and surveillance systems include individual series-type electrical drive circuits for separately energizing each of the field-generating coil windings with maximum efficiency and control, and transformer-type coupling between the different field-generating coil drive circuits to effect balanced and equalized current flow in the different coil windings and thereby enhance both drive efficiency and field uniformity. Additionally, a current-sense winding provides for monitoring of field coil current flow, and for feedback control of the magnitude and/or frequency of the coil excitation drive. In a preferred embodiment, the fields are generated by at least two coils on each opposite side of the field, and the coils are separately energized through separate but commonly-coupled drive circuits.

63 Claims, 13 Drawing Figures

PHASE COND. II

PHASE COND. III

METHOD AND APPARATUS FOR PRODUCING ELECTROMAGNETIC SURVEILLANCE FIELDS

TECHNICAL FIELD

This invention relates generally to electromagnetic field generation, and more particularly to producing, maintaining, and cyclically changing alternating electromagnetic fields of predetermined strength and particular resultant flux direction. Still more particularly, the invention relates to the utilization of such fields in electromagnetic surveillance systems of the general type in which an alternating electromagnetic field is maintained within and across an egress or entrance passage for detecting the presence within the passage of unauthorized articles or objects, e.g., merchandise, in which is hidden a marker or tag, preferably in the nature of a thin, narrow strip of Permalloy or other such material of extremely high permeability. Accordingly, the invention relates to the nature and physical structure and arrangement of the field-generating coils for such a surveillance system, and also to novel and desirable systems and circuitry for driving such coils while maintaining them in balance with one another through a number of different and varying phase relationships.

BACKGROUND OF THE INVENTION

As a general matter, the underlying concepts involved in electromagnetic field surveillance systems have been proposed heretofore by a number of different persons over a considerable span of time, dating back to at least about 1970 or before, at about which time the early work of Dr. Edward Fearon began to be published and seen in patents, etc. Actually, the work of Fearon was itself built upon technological phenomena published as long ago as 1934, by the French citizen P. A. Picard, to whom French Patent No. 763,681 was issued in 1934, such patent describing the perturbation effects produced by Permalloy and other such low-coercivity materials upon an alternating electromagnetic field. Based upon these early investigations of Picard, a number of persons have heretofore proposed the use of the technological phenomena involved for surveillance purposes, to detect attempted surreptitious movement of objects and articles past a point of egress or entrance if such objects or articles have hidden upon them a "tag" or "marker" of Permalloy or the like.

Much effort has been spent heretofore to refine and improve the basic systems proposed by early workers such as Fearon, for example, who himself is named in a number of prior patents for such improvements or enhancements. Generally fpeaking, most of the prior work has been done with the objective in mind of either improving the nature of the detection tag or marker device or to improve the detection and signal-analysis circuitry, primarily for the purpose of increasing the sensitivity or selectivity of the system so as to avoid erroneous alarm signals while at the same time missing detection of as few tags or markers as possible. In the latter connection, reference is made to previously-filed co-pending U.S. patent applications Ser. Nos. 358,299, now U.S. Pat. No. 4,535,323 and 358,383, now U.S. Pat. No. 4,524,350 by the present inventors and/or co-workers, which are commonly owned herewith.

In the aforementioned prior work, little has been indicated as to refinements and improvements in the interrogation field-generating apparatus and methodology, apart from describing generally the large physical size of the field-generating inductance coils themselves and noting that the same should be made part of a resonant LC circuit which has seemingly always been referred to as a parallel-connected or "tank" circuit, the resonant frequency of the tank circuit being rather generally selected, typically from the standpoint of merely producing the generally-desired interrogation field frequency. Apart from this, one of the few known publications or disclosures referring to particular methods or techniques involved in field generation or field characteristics is a prior U.S. Patent to Richardson, U.S. Pat. No. 4,300,183, which refers to the technique of alternately changing the phase relationships of the currents used to drive the resonant LC tank circuits, so that the resultant direction of the flux in the interrogation field was made to alternate in direction, thereby increasing the likelihood of detecting marker strips or the like which were physically oriented in varying directions, some of which might produce a relatively slight or negligible change in the interrogation field and thus obscure or preclude detection. In actuality, such phase alternation had already been known and utilized prior to that time, but generally speaking the concept is a valid one and as stated represents one of the few improvements made in the area of field generation or field characteristics over the many years in which the interrogation systems generally have been considered and/or used.

THE PRESENT INVENTION

The present invention provides a number of improvements in apparatus and methodology addressed to generating and maintaining oscillating electromagnetic interrogation fields. Generally speaking, the improvements of the present invention provide the very advantageous result of having uniform and balanced interrogation field strength and phasing while at the same time expending substantially less energy for the production and maintenance of such fields.

In a more particular sense, the present invention provides novel structural and positioning attributes and relatinships for the field-producing coils and, further, provides new and improved concepts for the configuration and operation of the drive circuits used for exciting the field-generating coils in interrogation or surveillance systems of the aforementioned type. In accordance with these concepts, coil drive excitation is applied and maintained in a new and improved manner involving series-resonant voltage injection circuitry which applies a controlled burst which is continuously updated in response to conditions actually prevailing at the field-generating coils. Also, in accordance herewith, the various field-generating coils within a system are maintained in continuous balance with one another, so as to enhance both efficient and economic operation while simultaneously further enhancing detection accuracy and consistency through the maintenance of balanced and predictable field density, configuration, and flux direction.

The foregoing attributes of the invention and the advantages provided thereby will become increasingly apparent upon further consideration of the ensuing specification, particularly when considered in light of the appended drawings, both of which set forth particular embodiments of the invention to illustrate the underlying concepts thereof.

DESCRIPTION OF THE PREFERRED EMBODIMENTS

Figure 1:
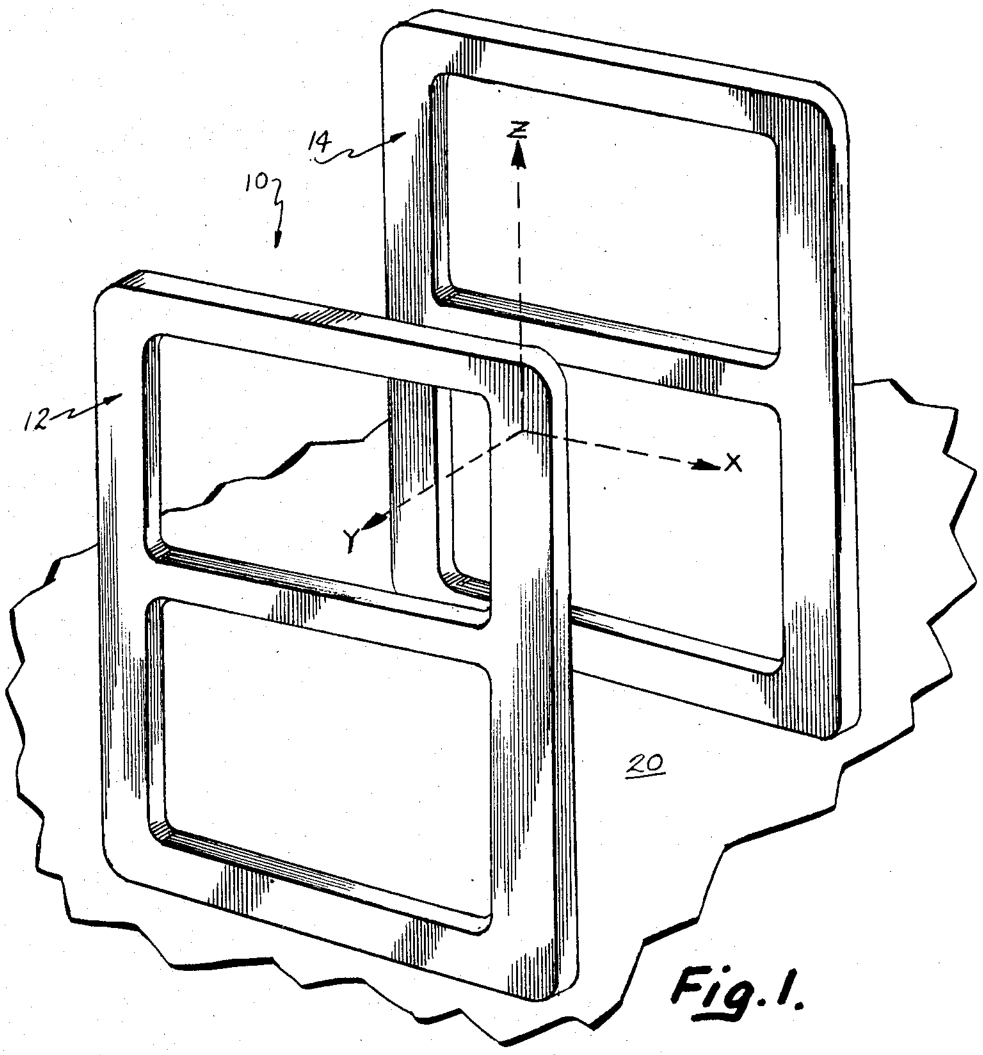
FIG. 1 is an enlarged, pictorial perspective view illustrating a generalized entry and egress passage defined by mutually-spaced "panels" housing the field-generating coils.

Referring first to FIG. 1 for an understanding of the general operating environment, an example of a typical egress or entrance passage 10 is depicted as defined by a pair of mutually-spaced "panels" 12 and 14, which constitute vertically-disposed, generally planar bulkhead members which may be on the order of about five feet in height and two feet in width, mutually spaced from one another by a distance on the order of three feet (by way of very generalized illustrative dimensions). As shown in FIG. 1, each of the panels 12, 14 may include an upper loop portion and a lower loop portion, giving the panel a somewhat figure eight-shaped appearance which is symmetrical about a vertical axis through the center of the panel. Both the upper loop portion and the lower loop portion of each panel house an interrogation field-generating coil of the general nature shown at 16 and 18 in FIG. 2, each such coil preferably having a generally rectangular configuration (e.g., generally square) but with rounded corners dictated by the flexibility of the electrical conductor from which the coils are formed. As shown in FIG. 1, both of the panels 12 and 14 rest upon a desired lower support surface 20, which may be the floor or walkway. Various means of supporting the two panels in their aforementioned relationship may no doubt be utilized.

Figure 6:
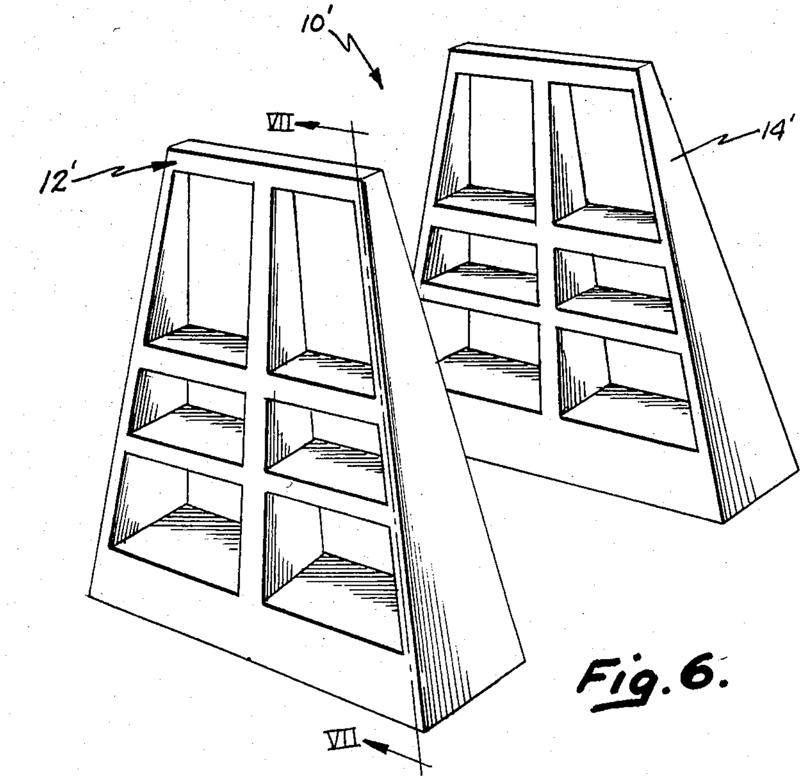
FIG. 6 is a pictorialized perspective view similar to FIG. 1 but showing a different type of panel structure for the field-generating coils.

A modified form of the field coil-housing panels, designated by the numerals 12' and 14'; is illustrated in FIG. 6. In a general way, these panels are much the same as those illustrated in FIG. 1, but include different appearance facors designed primarily for aesthetics. Thus, the panels 12' and 14' are truncated pyramids in both side and end elevation, and have six openings rather than two, as depicted in FIG. 1. In such an arrangement, the upper coil (e.g., 16 or 18) encircles the top four openings and the lower coil (e.g., 116 and 118) encircles the lower four openings; that is, the coils overlap in the middle of the panel so that they both encircle the two central openings. The form of panels 12' and 14' are discussed further hereinafter.

It has been customary in the past to form the field-generating coils 16 and 18 from wide strap-like copper conductor (for example, about one and one-half inches wide by one-tenth inch thick), but in accordance with the present invention it is preferred to use much finer stranded wire (for example, No. 8 or No. 10 stranded copper wire) which may advantageously be of the type in which each strand is separately insulated from the others (i.e., "Litz" wire). As explained below, use of stranded conductor provides lower effective resistance while actually using considerably less copper in the coils. When such stranded conductor is used, the multiple-turn coils are preferably "potted" or encapsulated, as by epoxy, so as to form a substantially rigid hoop, as generally shown in FIG. 2.

Figure 2:
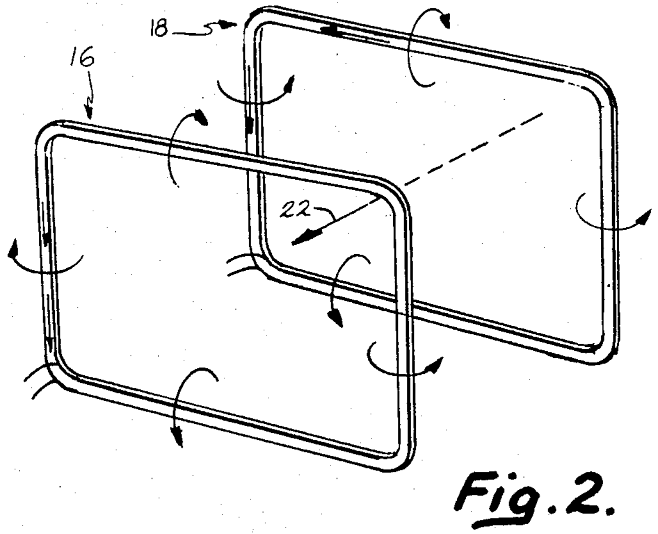
FIG. 2 is a perspective representation of a pair of oppositely-spaced field-generating coils, illustrating the general nature thereof and a typical pattern for currents and magnetic flux.

FIG. 2 also illustrates the general flux pattern produced by circulating currents within the coils having the direction shown by the arrows, in accordance with which flux patterns will be developed surrounding each of the conductor sections in the generally circular pattern illustrated. With the currents in the two coils travelling in the same direction, a resultant flux vector such as that shown at 22 will be produced, passing laterally through the center of both coils. With the coils disposed in panels opposite one another, as illustrated in FIG. 1, it will thus be seen that the resultant flux 22 will be in a horizontal right-to-left pattern for the current direction shown. Since as stated above the coils are energized so as to be in electrical oscillation, the alternating current will thus produce alternating and oppositely-directed flux vectors, i.e., horizontal and alternating between right-to-left and left-to-right flux vector orientation.

In order to maximize the likelihood of detecting markers or tags which may be physically positioned in any given random orientation, it is preferred to institute regular changes in the relative direction of current flow through the various coils constituting a set; thus, where four coils are utilized, as generally shown in FIG. 1, three particular different excitation phase relationships or conditions will produce the three different resultant flux vectors depicted by the arrows shown in FIG. 3.

Figure 3A:
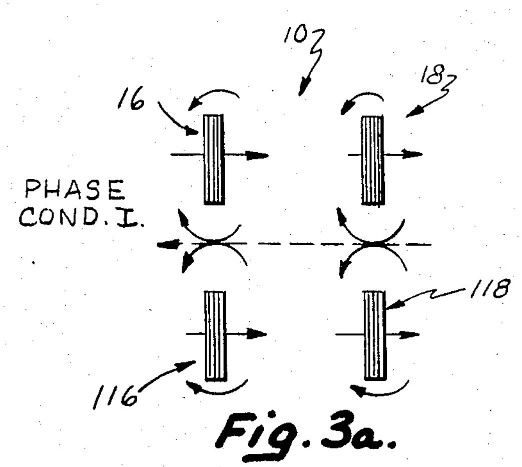
FIGS. 3a, 3b, and 3c are a succession of schematic representations depicting the field-producing coils of a typically surveillance area in accordance herewith, in which each opposite side has a pair of vertically-stacked coils, arrows being used to show resultant flux directions for various applied excitation phases, as labelled.
Figure 3B:
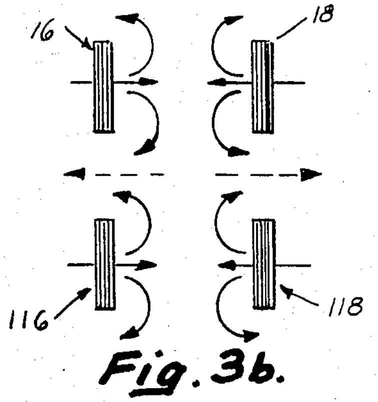
Figure 3C:
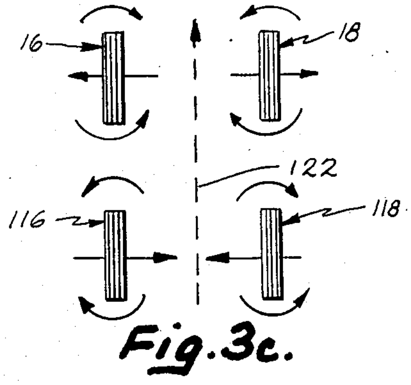

More particularly, it has previously become known in the art that direction of the resultant flux vector (e.g., vector 22 in FIG. 2) produced by a pair of adjacent field-generating coils defining a surveillance area or passage may be changed as a function of the relative phasing of the excitation applied to the respective coils. FIGS. 3a, 3b and 3c illustrate representative such variations in an illustrative surveillance area 10 whose sides are defined by a pair of vertically-stacked field-generating coils 16, 116 on the left and 18, 118 on the right, in the general arrangement illustrated in FIG. 1. Accordingly, in FIG. 3a, a Phase Condition I analogous to that illustrated in FIG. 2 produces flux vectors in each coil which are all oriented in the same general direction and which thus are aiding or reinforcing in a pair of adjacent coils such as coils 16 and 18. FIG. 3*b* illustrates a Phase Condition II in which the phasing of the coils 18 and 118 has been reversed from that of FIG. 3*a*, and in which the resultant flux vectors thus oppose in each pair of laterally-opposed and oppositely-spaced coils. In FIG. 3, the phasing (Phase Condition III) is such that the flux vectors in coils 16 and 18 are directed opposite to one another and also opposite to that of their respective vertically-associated coils 116 and 118, respectively. This produces the vertically-oriented field whose vector is designated by the numeral 122.

Figure 4:
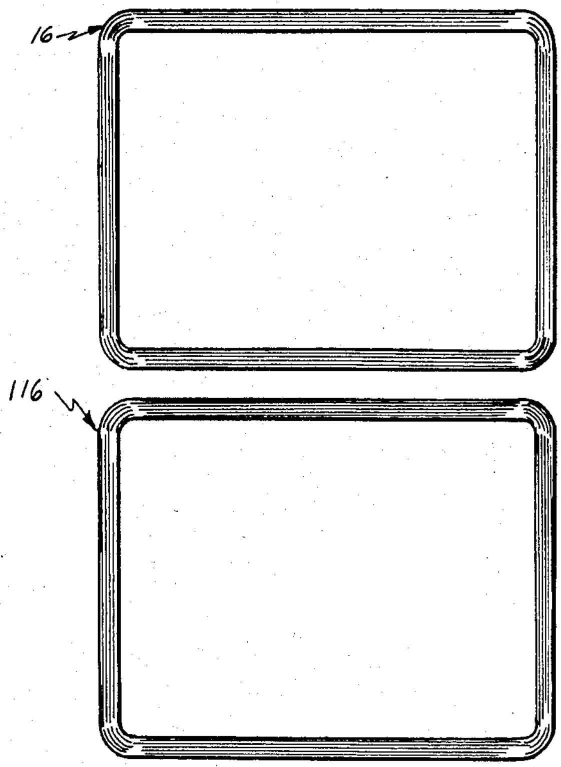
FIG. 4 is a side view representation of a pair of field-generating coils arranged in a first form of mutual disposition, with a space between the coils.
Figure 5:
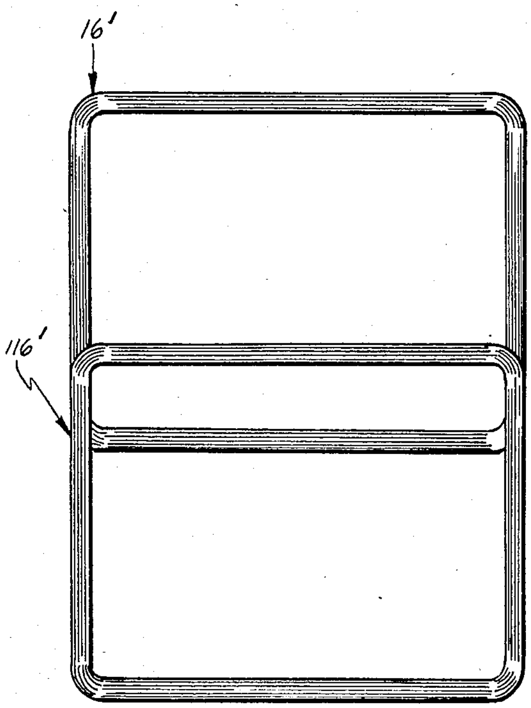
FIG. 5 is a view similar to FIG. 4 but showing improved coil positioning in accordance herewith.

The timing, application, and control of the field-generating excitation to produce the different flux patterns depicted in FIG. 3 in a continuous and rapidly-changing sequence is one major aspect of the presentation invention, and it is described hereinafter in connection with the circuitry depicted in FIG. 8. Prior to addressing that, however, attention is first directed to FIGS. 4 and 5. In FIG. 4, one arrangement is illustrated for a pair of vertically-aligned field-generating coils (e.g., coils 16, 116), by which a vertical flux vector may be obtained. FIG. 5 illustrates a new and preferred coil disposition for such a vertically-aligned coil system, in accordance with another attribute of the present invention.

More particularly, in previous electromagnetic field surveillance systems, the production of vertically-oriented flux vectors such as that illustrated in FIG. 3*c* has not generally been considered, or in any event has not been implemented, probably as a result of a belief that the two different conditions represented in FIGS. 3*a* and 3*b* produce sufficient field variation to detect marker tags oriented in any position which is reasonably likely to be encountered in real-life situations. In actuality, however, it is desirable to have a vertical field such as that shown in FIG. 3*c*, in order to provide assurance that the system will in fact detect any and all tags, with essentially absolute reliability, and also to further enhance accurate detection while eliminating erroneous alarms, which of course are very undesirable.

Accordingly, in considering systems for implementing the vertical flux vector condition in the most desirable way, it has been found that the vertically-aligned spaced coil relationship shown in FIG. 4, while useful to produce the vertical vector, noentheless has certain undesirable attributes whereas the unusual partially-overlapped configuration shown in FIG. 5 produces very desirable improvements from the standpoint of providing increased field uniformity while substantially reducing power requirements for the system. More particularly, the results of comparative evaluations for a typical coil arrangement of the type shown in FIG. 4 (coils vertically aligned but spaced vertically from one another a distance on the order of one and one-half inches), and for the most preferred overlap arrangement in accordance herewith (for coils on the order of twenty-five inches high, an overlap on the order of five inches per coil, i.e., total overlap area of ten inches for both coils) is illustrated in the two sets of tables below.

TABLE 1

CASE I

```
  72 - - - 1                                                                 1 - -
  70 - - 1                                                                     1 -
  68 - 1                                                                         1
  66 1       2             2                                 2             2
  64 1 2                         2                     2                         2
  63 2 3 4     4       3             2             2             3       4     4 3
  60 7 8 8 7 6   5 4     3               2     2               3     4 5   6 7 8 8
  58 + + + 9 7 6 5   4   3               2     2               3   4   5 6 8 + + +
  56 7 8 8 7 6   5 4     3             2         2             3     4 5   6 7 8 8
  54 2 3 4     4       3           2                 2           3       4     4 3
  52 1 2                       2                         2                       2
  50 1       2           2                                     2           2
  48 - 1                                                                         1
  46 - - 1                                                                     1 -
  44 - - - - 1                                                             1 - - -
Z 42 - - - - - - - - - - - 1             1 - - 1             1 - - - - - - - - - -
  40 - - - - - - - - - - - - - - - - - - - - - - - - - - - - - - - - - - - - - - -
A 38 - - - - - - - - - - - - - - - - - - - - - - - - - - - - - - - - - - - - - - -
X 36 - - - - - - - - - - - - - - - - - - - - - - - - - - - - - - - - - - - - - - -
I 34 - - - - - - - - - - - - - - - - - - - - - - - - - - - - - - - - - - - - - - -
S 32 - - - - - - - - - - - - - - - - - - - - - - - - - - - - - - - - - - - - - - -
  30 - - - - - - - - - - - - - - - - - - - - - - - - - - - - - - - - - - - - - - -
  28 - - - - - - - - - - - 1             1 - - 1             1 - - - - - - - - - -
  26 - - - - 1                                                             1 - - -
  24 - - 1                                                                     1 -
  22 - 1                                                                         1
  20 1       2             2                                 2             2
  18 1 2                         2                     2                         2
  16 2 3 4     4       3             2             2             3       4     4 3
  14 7 8 8 7 6   5 4     3               2     2               3     4 5   6 7 8 8
  12 + + + 9 7 6 5   4   3               2     2               3   4   5 6 8 + + +
  10 7 8 8 7 6   5 4     3             2         2             3     4 5   6 7 8 8
   8 2 3 4     4       3           2                 2           3       4     4 3
   6 1 2                       2                         2                       2
   4 1       2           2                                     2           2
   2 - 1                                                                         1
   0 - - - -   - - - -   - - - -   - - - -   - - - -   - - - -   - - - -   - - - -   ----  ----
    0       5         1 0       1 5       2 0       2 5       3 0       3 5       4 0   4 5
                                          Y AXIS
```

TABLE 2

CASE I

```
  72 - - 1                                                                     1 -
  70 - 1                                                                         1
  68 - 1           2       2                                 2       2           1
  66 1     2                                                                 2
  64 1 2   3         3                                             3         3   2
  62 2 4           4       3                                 3       4           3
  60 7 9 9 8 7 6 5   4       3                             3       4   5 6 7 8 9 8
  58 + + + + 8 7 6 5   4       3                         3       4   5 6 7 9 + + +
  56 7 9 9 8 7 6 5     4       3                         3       4     5 6 7 8 9 8
  54 2 4             4       3                             3       4             3
  52 1 2 3                 3                                 3                 3 2
  50 1   2   3           3                                     3             3   2
  48 1   2     3     3                                             3     3     2
  46 1 2   3           3                                         3           3   2
  44 2 3 4       4     3           2                 2           3     4       4 3
Z 42 7 9 9 8 7 6 5   4     3                                 3     4   5 6 7 8 9 8
  40 + + + + 8 7 6 5     4     3                         3     4     5 6 7 9 + + +
A 38 7 9   9 8 7 6   5   4       3                     3       4   5   6 7 8 9   8
X 36 3 5 6       6   5     4       3                 3       4     5   6       6 4
I 34 3 5 6       6   5     4       3                 3       4     5   6       6 4
S 32 7 9   9 8 7 6   5   4       3                     3       4   5   6 7 8 9   8
  30 + + + + 8 7 6 5     4     3                         3     4     5 6 7 9 + + +
  28 7 9 9 8 7 6 5   4     3                                 3     4   5 6 7 8 9 8
  26 2 3 4       4     3           2                 2           3     4       4 3
  24 1 2   3           3                                         3           3   2
  22 1   2     3     3                                             3     3     2
  20 1   2   3           3                                     3           3   2
  18 1 2 3                 3                                 3                 3 2
  16 2 4             4       3                             3       4             3
  14 7 9 9 8 7 6 5     4       3                         3       4     5 6 7 8 9 8
  12 + + + + 8 7 6 5   4       3                         3       4   5 6 7 9 + + +
  10 7 9 9 8 7 6 5   4       3                           3       4   5 6 7 8 9 8
   8 2 4           4       3                               3       4           3
   6 1 2   3         3                                             3         3   2
   4 1     2                                                                 2
   2 - 1           2       2                                 2       2           1
   0 - - - - - - - - - - - - - - - - - - - - - - - - - - - - - - - - - - - - - - -
    0        5         1 0       1 5       2 0       2 5       3 0       3 5       4 0   4 5
                                        Y AXIS
```

TABLE 3

CASE II

| Z AXIS | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|
| 72 | - | - | - | - | - | 1 | | | | | | | | | | | | | | | | | | | | | | | | | | | | - | 1 | - | - | - | - |
| 70 | - | - | - | 1 | | | | | | | | | | | | | | | | | | | | | | | | | | | | | | | | | 1 | - | - |
| 68 | - | - | 1 | | | | | | | | | | | | | | | | | | | | | | | | | | | | | | | | | | | 1 | - |
| 66 | - | 1 | | | | | | | | | | | | | | | | | | | | | | | | | | | | | | | | | | | | | 1 |
| 64 | 1 | | | 2 | | | | | 2 | | | | | | | | | | | | | | | | | | | | | | | 2 | | | | | 2 | | |
| 62 | 1 | 2 | | 3 | 3 | | | | | | | 2 | | | | | | | | | | | | | | | | | 2 | | | | | | | 3 | 3 | | 2 |
| 60 | 5 | 6 | 6 | 5 | 4 | | | 3 | | | | | 2 | | | | | | | | | | | | | | | 2 | | | | | 3 | | | 4 | 5 | 6 | 6 |
| 58 | + | + | 8 | 6 | 5 | 4 | | 3 | | | | | 2 | | | | | | | | | | | | | | | 2 | | | | | 3 | | 4 | 5 | 7 | + | + |
| 56 | 5 | 6 | 6 | 5 | 4 | | | 3 | | | | | 2 | | | | | | | | | | | | | | | 2 | | | | | 3 | | | 4 | 5 | 6 | 6 |
| 54 | 1 | 2 | | 3 | 3 | | | | | | | 2 | | | | | | | | | | | | | | | | | 2 | | | | | | | 3 | 3 | | 2 |
| 52 | 1 | | | 2 | | | | 2 | | | | | | | | | | | | | | | | | | | | | | | | | 2 | | | | 2 | | |
| 50 | - | 1 | | | | | | | | | | | | | | | | | | | | | | | | | | | | | | | | | | | | | 1 |
| 48 | - | - | 1 | | | | | | | | | | | | | | | | | | | | | | | | | | | | | | | | | | | 1 | - |
| 46 | - | - | - | - | 1 | | | | | | | | | | | | | | | | | | | | | | | | | | | | | | | 1 | - | - | - |
| 44 | - | - | - | - | - | - | - | - | 1 | | | | | | | | | | | | | | | | | | | | | | | 1 | - | - | - | - | - | - | - |
| 42 | - | - | - | - | - | - | - | - | - | - | - | - | - | - | - | - | - | - | - | - | - | - | - | - | - | - | - | - | - | - | - | - | - | - | - | - | - | - | - |
| 40 | - | - | - | - | - | - | - | - | - | - | - | - | - | - | - | - | - | - | - | - | - | - | - | - | - | - | - | - | - | - | - | - | - | - | - | - | - | - | - |
| 38 | - | - | - | - | - | - | - | - | - | - | - | - | - | - | - | - | - | - | - | - | - | - | - | - | - | - | - | - | - | - | - | - | - | - | - | - | - | - | - |
| 36 | - | - | - | - | - | - | - | - | - | - | - | - | - | - | - | - | - | - | - | - | - | - | - | - | - | - | - | - | - | - | - | - | - | - | - | - | - | - | - |
| 34 | - | - | - | - | - | - | - | - | - | - | - | - | - | - | - | - | - | - | - | - | - | - | - | - | - | - | - | - | - | - | - | - | - | - | - | - | - | - | - |
| 32 | - | - | - | - | - | - | - | - | - | - | - | - | - | - | - | - | - | - | - | - | - | - | - | - | - | - | - | - | - | - | - | - | - | - | - | - | - | - | - |
| 30 | - | - | - | - | - | - | - | - | - | - | - | - | - | - | - | - | - | - | - | - | - | - | - | - | - | - | - | - | - | - | - | - | - | - | - | - | - | - | - |
| 28 | - | - | - | - | - | - | - | - | - | - | - | - | - | - | - | - | - | - | - | - | - | - | - | - | - | - | - | - | - | - | - | - | - | - | - | - | - | - | - |
| 26 | - | - | - | - | - | - | - | - | 1 | | | | | | | | | | | | | | | | | | | | | | | 1 | - | - | - | - | - | - | - |
| 24 | - | - | - | - | 1 | | | | | | | | | | | | | | | | | | | | | | | | | | | | | | | 1 | - | - | - |
| 22 | - | - | 1 | | | | | | | | | | | | | | | | | | | | | | | | | | | | | | | | | | | 1 | - |
| 20 | - | 1 | | | | | | | | | | | | | | | | | | | | | | | | | | | | | | | | | | | | | 1 |
| 18 | 1 | | | 2 | | | | | 2 | | | | | | | | | | | | | | | | | | | | | | | 2 | | | | | 2 | | |
| 16 | 1 | 2 | | 3 | 3 | | | | | | | 2 | | | | | | | | | | | | | | | | | 2 | | | | | | | 3 | 3 | | 2 |
| 14 | 5 | 6 | 6 | 5 | 4 | | | 3 | | | | | 2 | | | | | | | | | | | | | | | 2 | | | | | 3 | | | 4 | 5 | 6 | 6 |
| 12 | + | + | 8 | 6 | 5 | 4 | | 3 | | | | | 2 | | | | | | | | | | | | | | | 2 | | | | | 3 | | 4 | 5 | 7 | + | + |
| 10 | 5 | 6 | 6 | 5 | 4 | | | 3 | | | | | 2 | | | | | | | | | | | | | | | 2 | | | | | 3 | | | 4 | 5 | 6 | 6 |
| 8 | 1 | 2 | | 3 | 3 | | | | | | | 2 | | | | | | | | | | | | | | | | | 2 | | | | | | | 3 | 3 | | 2 |
| 6 | 1 | | | 2 | | | | 2 | | | | | | | | | | | | | | | | | | | | | | | | | 2 | | | | 2 | | |
| 4 | - | 1 | | | | | | | | | | | | | | | | | | | | | | | | | | | | | | | | | | | | | 1 |
| 2 | - | - | 1 | | | | | | | | | | | | | | | | | | | | | | | | | | | | | | | | | | | 1 | - |
| 0 | - | - | - | - | | - | - | - | - | | - | - | - | - | | - | - | - | - | | - | - | - | - | | - | - | - | - | | - | - | - | - | | - | - | - | - |

0 5 10 15 20 25 30 35 40 45

Y AXIS

TABLE 4

CASE II

| Z AXIS | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|
| 72 | - | - | - | 1 | | | | | | | | | | | | | | | | | | | | | | | | | | | | | | | | 1 | - | - |
| 70 | - | - | 1 | | | | | | | | | | | | | | | | | | | | | | | | | | | | | | | | | | 1 | - |
| 68 | - | 1 | | | | | | | | | | | | | | | | | | | | | | | | | | | | | | | | | | | | 1 |
| 66 | 1 | | | | | | | | | | | | | | | | | | | | | | | | | | | | | | | | | | | | | |
| 64 | 1 | | 2 | | | | | | | | | | | 2 | | | | | | | | | | | | | 2 | | | | | | | | | | | 2 | |
| 62 | 2 | 3 | | | | | 3 | | | | | | | | | | | 2 | | | | | 2 | | | | | | | | | | | 3 | | | | | 3 |
| 60 | 6 | 7 | 7 | 6 | 5 | 4 | | | 3 | | | | | | | | | | | | | | | | | | | | | | | 3 | | | 4 | 5 | 6 | 7 | 7 |
| 58 | + | + | + | 7 | 6 | 5 | 4 | | | 3 | | | | | | | | | | | | | | | | | | | | | 3 | | | 4 | 5 | 6 | 9 | + | + |
| 56 | 6 | 7 | 7 | 6 | 5 | | 4 | | | 3 | | | | | | | | | | | | | | | | | | | | | 3 | | | 4 | | 5 | 6 | 7 | 7 |
| 54 | 2 | 3 | | | | | | 3 | | | | | | | | | | | | | | | | | | | | | | | | | 3 | | | | | | 3 |
| 52 | 1 | | 2 | | | | | | | | | | | | | | | | | | | | | | | | | | | | | | | | | | | 2 | |
| 50 | 1 | | | 2 | | | | | | | | | | | | | | 2 | | | | | 2 | | | | | | | | | | | | | | 2 | | |
| 48 | 1 | | | 2 | | | | | | | | | | | 2 | | | | | | | | | | | 2 | | | | | | | | | | | 2 | | |
| 46 | 1 | | 2 | | | | | | | | | | 2 | | | | | | | | | | | | | | | 2 | | | | | | | | | | 2 | |
| 44 | 1 | 2 | 3 | | | 3 | | | | | | 2 | | | | | | | | | | | | | | | | | 2 | | | | | | 3 | | | 3 | 2 |
| 42 | 6 | 7 | 7 | 6 | 5 | 4 | | | 3 | | | | | | 2 | | | | | | | | | | | 2 | | | | | | 3 | | | 4 | 5 | 6 | 7 | 7 |
| 40 | + | + | + | 7 | 6 | 5 | | 4 | | 3 | | | | | | | | 2 | | | | | 2 | | | | | | | | 3 | | 4 | | 5 | 6 | 9 | + | + |
| 38 | 6 | 7 | 7 | 6 | | 5 | | 4 | | | 3 | | | | | | | | | | | | | | | | | | | 3 | | | 4 | | 5 | | 6 | 7 | 7 |
| 36 | 2 | 3 | 4 | | | | | 4 | | | | 3 | | | | | | | | | | | | | | | | | 3 | | | | 4 | | | | | 4 | 3 |
| 34 | 2 | 3 | 4 | | | | | 4 | | | | 3 | | | | | | | | | | | | | | | | | 3 | | | | 4 | | | | | 4 | 3 |
| 32 | 6 | 7 | 7 | 6 | | 5 | | 4 | | | 3 | | | | | | | | | | | | | | | | | | | 3 | | | 4 | | 5 | | 6 | 7 | 7 |
| 30 | + | + | + | 7 | 6 | 5 | | 4 | | 3 | | | | | | | | 2 | | | | | 2 | | | | | | | | 3 | | 4 | | 5 | 6 | 9 | + | + |
| 28 | 6 | 7 | 7 | 6 | 5 | 4 | | | 3 | | | | | | 2 | | | | | | | | | | | 2 | | | | | | 3 | | | 4 | 5 | 6 | 7 | 7 |
| 26 | 1 | 2 | 3 | | | 3 | | | | | | 2 | | | | | | | | | | | | | | | | | 2 | | | | | | 3 | | | 3 | 2 |
| 24 | 1 | | 2 | | | | | | | | | | 2 | | | | | | | | | | | | | | | 2 | | | | | | | | | | 2 | |
| 22 | 1 | | | 2 | | | | | | | | | | | 2 | | | | | | | | | | | 2 | | | | | | | | | | | 2 | | |
| 20 | 1 | | | 2 | | | | | | | | | | | | | | 2 | | | | | 2 | | | | | | | | | | | | | | 2 | | |
| 18 | 1 | | 2 | | | | | | | | | | | | | | | | | | | | | | | | | | | | | | | | | | | 2 | |
| 16 | 2 | 3 | | | | | | 3 | | | | | | | | | | | | | | | | | | | | | | | | | 3 | | | | | | 3 |
| 14 | 6 | 7 | 7 | 6 | 5 | | 4 | | | 3 | | | | | | | | | | | | | | | | | | | | | 3 | | | 4 | | 5 | 6 | 7 | 7 |
| 12 | + | + | + | 7 | 6 | 5 | 4 | | | 3 | | | | | | | | | | | | | | | | | | | | | 3 | | | 4 | 5 | 6 | 9 | + | + |
| 10 | 6 | 7 | 7 | 6 | 5 | 4 | | | 3 | | | | | | | | | | | | | | | | | | | | | | | 3 | | | 4 | 5 | 6 | 7 | 7 |
| 8 | 2 | 3 | | | | | 3 | | | | | | | | | | | 2 | | | | | 2 | | | | | | | | | | | 3 | | | | | 3 |
| 6 | 1 | | 2 | | | | | | | | | | | 2 | | | | | | | | | | | | | 2 | | | | | | | | | | | 2 | |
| 4 | 1 | | | | | | | | | | | | | | | | | | | | | | | | | | | | | | | | | | | | | |
| 2 | - | 1 | | | | | | | | | | | | | | | | | | | | | | | | | | | | | | | | | | | | 1 |
| 0 | - | - | - | - | | - | - | - | - | | - | - | - | - | | - | - | - | - | | - | - | - | - | | - | - | - | - | | - | - | - | - | | - | - | - | - |

0 5 10 15 20 25 30 35 40 45

Y AXIS

In the above tables, Case I shows the vertical-vector field intensity distribution in a plane passing through the center of the surveillance passage (e.g., 10) perpendicular to the coil-housing panels (e.g., 12 and 14); i.e., the plane YZ, according to the axis shown in dashed lines in FIG. 1. Within Case I, Table 1, pertains to the slightly spaced coil arrangement depicted in FIG. 4, while Table 2 pertains to the overlapped arrangement shown in FIG. 5. Within each such table, the numbers in the first column at the left identity vertical distances, in inches, upward from the floor 20 (labeled "Z axis") while the numbers along the bottom identify distances in inches across the width of the passage (labeled "Y axis"). The remaining numbers in the tables represent peak vertical-vector field intensity (flux density) in Gauss, at all various indicated Y-Z coordinate points for all phases of field excitation (i.e., maximum vertical-vector flux density obtained for any phase of applied excitation as illustrated in FIG. 3).

Accordingly, Case I, Table 1 above illustrates both graphically and numerically the magnetic field intensity distribution along the vertical flux axis of the surveillance field for the field-generating coil arrangements shown in FIG. 4, in which a small spacing exists between the two vertically-aligned coils (for example, a spacing on the order of five to six percent of the overall height of two generally rectangular coils), with applied excitation sufficient to produce a minimum field intensity of on the order of one Gauss at the weakest point in the field (actually, many points have somewhat less than that, as indicated by the "−" signs). Under these conditions, as Table 1 illustrates, the result is a field whose intensities vary over a wide range, in which many of the measured field intensities are of a far greater magnitude than necessary, representing substantial wasted power.

On the other hand, with reference to Case I, Table 2, and under the same basic conditions described above except for having the coils in the overlapped configuration illustrated in FIG. 5, it will be seen that much less variation, i.e., much greater field uniformity, is the overall result, and that the magnitude of both the undesirably low and the unnecessarily high flux intensities are considerably improved over what is shown in Table 1.

The improvements in field intensity distribution illustrated in Case I, Tables 1 and 2 and described generally above are further evidenced and illustrated in Case II, Tables 3 and 4, which have the same general bases but depict the resulting field intensities in a plane parallel to that of Case I but located outward along the X axis a distance of ten inches therefrom. As will be seen by inspection, the field intensity distribution obtained with the overlapped coil geometry of FIG. 5, contained in Table 4 of Case II, is once again greatly superior to that of the spaced-coil (FIG. 4) arrangement set forth in Table 3.

A most important point to make clear with respect to the data of the above tables is that the level of field-generating coil excitation required to produce a given minimum field intensity at any point as set forth in Tables 2 and 4 is substantially less than that required to produce the same minimum field in accordance with the results in Tables 1 and 3; in fact, the required current is decreased by on the order of one-third, thus reducing power consumption by on the order of one-half (since power is a function of the square of the current). Of course, it must also be remembered that use of the preferred stranded conductors to implement the field coils additionally reduces required excitation, and in particular, losses while also using significantly less copper than the wide strap-form conductors used heretofore. These benefits are very significant, since they not only reduce expense outright but also reduce ambient heat, thus promoting reliability, etc. A highly further significant benefit obtained in this manner from the greater resulting field uniformity is enhanced detection accuracy and consistency, which of course is the most important consideration of all, detection accuracy meaning not only increased sensitivity to enable detection of low-level signals, but also increased selectivity and repeatability, eliminating erroneous alarms resulting from marginally low-level detection signals which are difficult to distinguish from noise, transient disruptions, etc.

Accordingly, the overlapped coil configuration depicted in FIG. 5 represents a very significant system enhancement. With respect to the particularities of the overlap, it may be stated that various degrees of overlap produce degrees of improvement generally representative of the results depicted in Tables 2 and 4, but an optimal condition of overlap is felt to be on the order of about ten inches total for a pair of generally rectangular (or trapezoidal) coils approximately twenty-three inches wide and twenty-eight inches high each, i.e, each coil is vertically extended approximately five inches beyond the horizontal line at which their adjacent boundaries would otherwise be contiguous, a condition which may be generally identified as being on the order of about 20–25% overlap. Distinctly favorable results are achieved even at significantly greater (as well as less) overlap, up to for example, about 35%, or even somewhat more than that, but less than the point at which the net effect becomes more like that of a single coil, as would result from superimposing or only slightly offsetting the two coils, or the point where the net effect is more like that of two separate vertically-spaced coils, as in FIG. 4.

Further, with respect to the results obtained by the overlapped coil relationship shown in FIG. 5, in particular the reduction in current requirements, and considering the preferred coil winding structure involving the use of smaller-diameter stranded wire, the drive current may be markedly decreased even though an actual increase in field intensity is obtained at the weakest points, and a more uniform field intensity obtained. In this regard, the smaller-diameter stranded wire provides the desirable attribute of substantially lowered total effective resistance, because of lower AC resistance (due to less skin effect) at the nominal 10 kHz oscillation frequency for the coils, compared to the physically large strap-type conductors utilized in prior systems, while actually using less copper. Thus, although the DC resistance of such strap-type conductors was substantially less than that of, for example, No. 10 stranded wire, the total resistance under operating conditions is considerably less with the stranded conductor even though much less copper is used, taking the decreased AC resistance into consideration. Accordingly, the Q of the oscillating circuit may actually be increased by a significant amount even though the nominal (DC) resistance of the stranded conductor is substantially higher than that of the strap conductor utilized previously, and even though some forty turns of the stranded No. 10 conductor are used to replace the six turns of copper strap utilized in prior systems.

Figure 7:
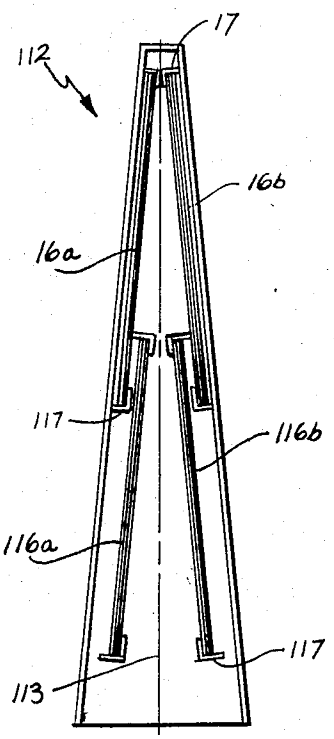
FIG. 7 is an enlarged cross-sectional elevational view taken through the plane VII—VII of FIG. 6.

A further enhancement in the overlapped form of the drive coils illustrated in FIG. 5 is shown in FIG. 7, which may be considered to represent a sectional view through the panels 12' or 14' of FIG. 6 as well as the panels 12, 14 of FIG. 1. In essence, the principle involved is to wind the respective coils in a relatively loosely-bundled manner and to in effect interleaf the windings of one coil with the other, at least to the extent of spreading the coils into two or more groupings of turns and placing the turns of one such coil between the turns of the other. The effect of this is to lower the inductance of each coil without changing its ampere-turns, by which the field remains substantially the same in overall shape and makeup, but very intense localized field-intensities are reduced and, most importantly, the required energy, and time, to bring the electromagnetic field to a state of sustained oscillation is also reduced. At the same time, reducing the level of excitation required due to the resulting lower inductance provides for lower capacitance requirements and enhances more conservative circuit design.

Referring more particularly to the arrangement shown in FIG. 7, both to the upper coil 16 and lower coil 116 are shown as being provided in the form of two bundles, designated 16(*a*) and 16(*b*), and 116(*a*), 116(*b*), respectively, each bundle being securely held in place within the panel by suitable supports 17, 117 attached to the panel structure. As will be understood, the two bundles of each coil are connected in series so as to form in effect a single coil. In the arrangement illustrated, all of the coil bundles are angled somewhat from vertical so that the lower bundles may be placed between the diverging lower extremities of the upper bundles in order to form the "overlap" described above. With this arrangement, each set of coil bundles may be symmetrically and equally spaced with respect to a vertical plane 113 through the center of the panel, in which a detection loop ("antenna") may be located. Of course, the arrangement of FIG. 7 should be understood as generally illustrating the underlying principle, as well as showing one particular preferred embodiment, in that the coil-separating "bundling" and interleaving concept shown could be carried much further.

Figure 8:
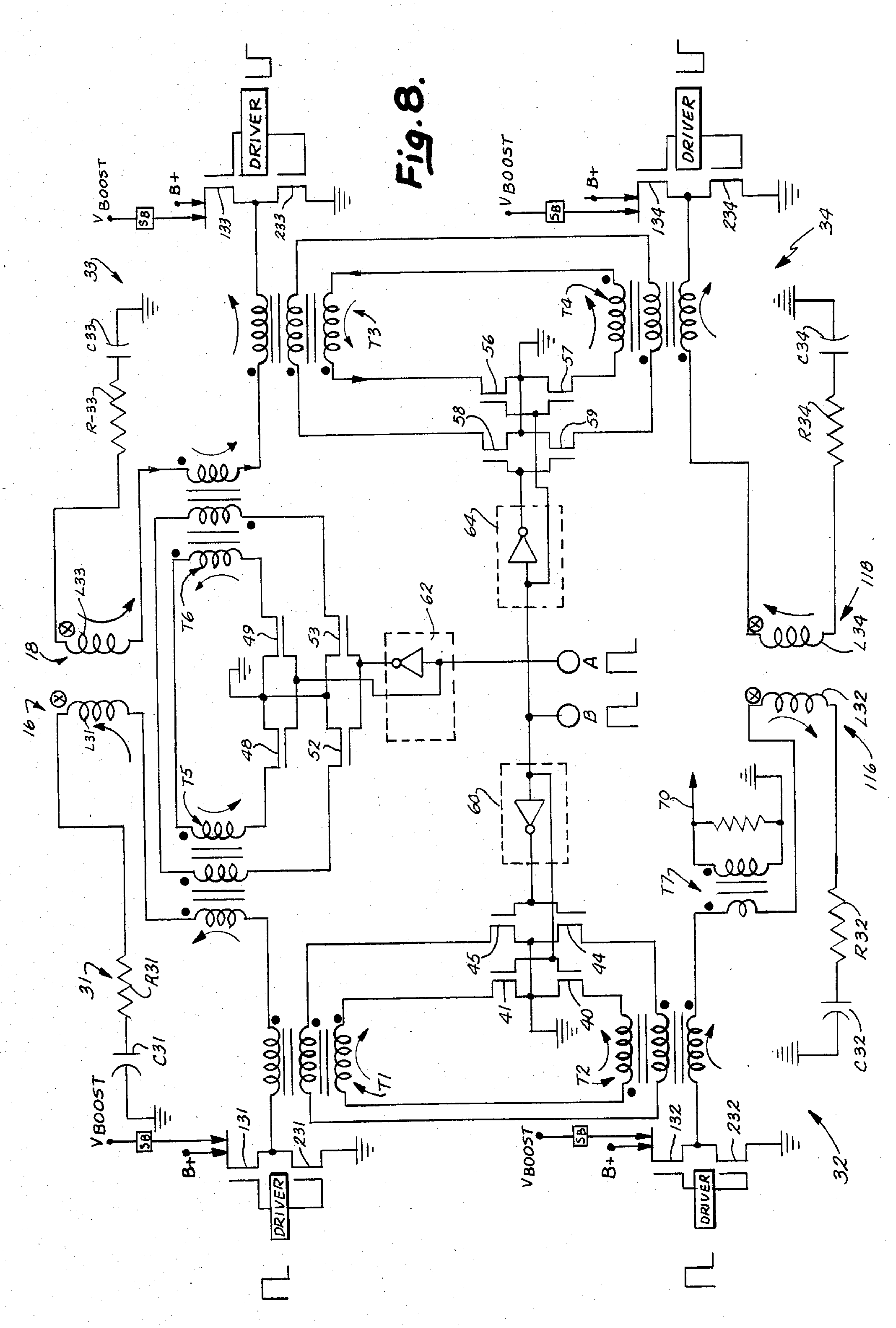
FIG. 8 is an electrical schematic diagram illustrating preferred field-generating excitation circuitry in accordance herewith.

Referring now to the preferred drive circuitry 30 illustrated in FIG. 8, it will be noted that such circuit includes four different, but identically-configured, series-resonant voltage-injection drive circuit branches, designated 31, 32, 33, and 34, respectively. In each such series circuit, there is a capacitor, inductor and an included effective resistance, such components being designated by the prefix "C", "L", or "R", followed by a suffix number corresponding to the circuit branch in which it is located, e.g., C31, L31, R31, etc. Of these components, the inductance in reality constitutes one of the associated surveillance field-generating coils, e.g., vertically-stacked coils 16, 116 and adjacent vertically-stacked coils 18, 118, and such inductances are so labelled in FIG. 8 and the resistance R is the effective AC resistance (as described before) of each coil plus the equivalent resistance of the driver devices. Neglecting for the amount the transformers appearing in each such circuit branch, which are discussed below, each of the series-resonant coil-excitation branches 31–34 inclusive additionally include a series-mode square wave generator, comprising (in the embodiment shown) a pair of totem-pole FETs, designated for convenience 131, 231 (branch 31); 132, 232 (branch 32), etc. As illustrated, each such pair of FETs is series-connected between a "B+" DC voltage source and ground, with their gates connected for alternate or opposite actuation, by a "driver" input, by which either FET in each such pair may be oppositely switched on and off, depending on the polarity of the applied driver signal. For purposes of present discussion, each such driver input may be considered as an independent switching control having a frequency or pulse-repetition rate equal to the resonant frequency of the series coil excitation circuit which it controls, although in fact each such "driver" may constitute a control line from a common master system microprocessor controller.

In general, the operation of each of the series excitation circuits 31–34 inclusive may be in either of two selective modes, i.e., application of selective opposite-polarity pulse actuation signals by the associated driver to the interconnected gates of a given pair of series-connected FET switches will cause one or the other such switch to conduct, depending upon the polarity of the applied excitation. Each such FET (which may be of the type designated "BUZ 24" devices) (manufactured by Siemens) has an integral back-biased diode; thus, such selective control signals applied to the gates will cause current flow within the series-resonant circuit branch either in a direction toward the FETs or away from them, toward the ground point, which is shown at the capacitor end of each branch. This has the effect of selectively changing the phase of the coil excitation from one to the other of its possible conditions, thus controlling the resultant direction of the induced current in, and flux produced by, that inductor. Accordingly, it will be seen that by appropriate selection and timing of the applied driver control signals applied to each of the paired FET switches, the different flux conditions illustrated in FIG. 3 may be produced. By way of illustration, using the encircled "x" designation illustrated in FIG. 8 at one or the other end extremity of each of the field-generating coils L31, L32, etc. and with the indicated respective positive-going ("high") or negative-going ("low") control signals applied to the FET switch gates, each of the series-resonant circuit branches will have current flow in the direction indicated by the arrow, and the resultant magnetic flux condition will be that illustrated in FIG. 3(*c*), producing a resultant vertical flux vector.

It is to be particularly noted, in connection with the aforementioned coil driver circuit 30, that use of the series-resonant voltage-source type injection drive circuits 31–34 shown is a distinct departure from the coil-excitation circuitry used hereintofore. That is, in prior systems the resonant circuit was in the form of a parallel "tank" circuit, with the field-generating coil being centertapped and connected to the supply voltage. In such a circuit, appropriate switching resulted in the selective grounding of one or the other end of each of the center-tapped inductors, thus causing current flow in one or the other direction through half of the inductor. Such a circuit is at its very best only fifty percent efficient even if driven with maximum efficiency (minimum losses). Also, such a circuit operates as having a current-source input, or on a constant-current principle, having a series-connected current-limiting resistor to establish the desired current level in the circuit. In the case of the illustrated, preferred, series-resonant circuit, the mode of operation is as a voltage source, rather than a current source, and the full length of the field-generating coil is driven at all times, rather than merely one-half of it. While discussed more fully hereinafter, the resulting form of the voltage applied to the series-resonant circuits is preferably of square-wave form, of a nominal frequency of about 10 kHz in the most preferred embodiment (which is the highest which may be used without having to comply with FCC requirements). By using such a square wave drive, circuit efficiency is further maximized, such that with a relatively high-Q series resonant circuit (on the order of 100, or more), the voltage and current present within the resonant circuit rapidly build as the square wave is applied, the series resonance of the circuit at the nominal 10 kHz frequency of excitation presenting essentially zero reactance, and the effective impedance thus being merely the included resistive component. The oscillating current thus rapidly builds, but in accordance herewith it should also be noted that (as discussed more fully herebelow), in order to maximize the responsiveness of the circuit, i.e., to minimize the time required to bring the circuit energy level up, and down from, sustained resonance, it is preferred to both begin and end each different phase condition of excitation by applying a substantially greater "boost up" and "boost down" voltage, and to use a lower level of excitation during the periods of steady-state resonance at the desired peak flux level.

Commenting somewhat further with respect to the operation of the FET switches, because such components have extremely low resistance when conducting in the forward direction when turned "On" by their gate (generally considered zero resistance) but additionally have very high resistance in the "Off" state to block unwanted conduction, the totempole arrangement of paired FETs results in what is in effect a zero-impedance switch for applying the field-coil excitation square wave voltage. Accordingly, there is virtually no power loss, in effect, by using such switches. In view of the above comments with respect to the advantages of using series-resonant circuitry, it will therefore be appreciated that each of the series excitation circuits, 31, etc., is an extremely low-loss circuit, with virtually no leakage current through the FETs when they are off. Thus, if the Q of the circuit is very high (say, 200), the actual voltage excursion which can be produced within such a circuit from an applied excitation of about twenty volts is on the order of 2,000 volts, peak-to-peak, at which condition approximately 10 amps of current is circulating through, but not being lost in, the series-resonant circuit. Thus, effiencies approaching 100% can be achieved, whereas, as stated above, the maximum efficiency with prior art excitation circuits was 50%, and the realizable efficiency was much less than that. Accordingly, the totem-pole (series-connected) FET switch arrangement noted above is certainly included in the most preferred embodiments of the invention; however, it should also be noted that other functionally similar switching may be utilized, for example, transformers or relays, e.g., reed relays. Also, excitation could be accomplished by sine wave or the like, but the noted square wave excitation is inherently more likely to yield greater efficiency.

In view of the foregoing information, it will be appreciated that under conditions of actual operation, each of the four series coil-excitation circuits 31–34 inclusive undergoes repeated changes in the phase of its applied excitation, in order to produce the changes in resultant flux vector direction noted. Preferably, this is accomplished by applying the aforementioned square wave excitation synchronously with the cycles of the AC line voltage prevailing at the place of operation, since in this manner a high degree of synchronism will automatically be obtained for the different drives and fields of each installation and, moreover, for different separate installations in areas of proximity, which might otherwise interact with one another in various ways, i.e., through the electromagnetic fields produced. A preferred such timing for the applied square wave, which is nominally of 10 kHz frequency, is to set system timing on the basis of the AC line voltage frequency and phasing, as by dividing the time of each half-cycle of the 60 Hertz line into three uniform time segments, and then to synchronize the phasing of the (nominally) 10 kHz square wave driver signal for each of the three desired different phase (flux vector) conditions to the three successive such time segments. Thus, the repetition rate for the different bursts of applied nominal 10 kHz square wave drive is, for three phase conditions and a 60 Hz line, 180 Hz. In particular, considering the time required for building up to full resonance in each phase condition and the time required for quieting the resonance oscillations of that phase in preparation for the next ensuing phase condition, a preferred total time basis for applying each successive different phase condition is about five and two-thirds milliseconds, during which time there will be on the order of fifty-five cycles of the nominal 10 kHz square wave. Accordingly, each instance of Phase Condition I will be timed to commence at the zero crossing of the line frequency and continue for 120° of the line alternation, whereupon, each Phase Condition II will commence and continue for a like duration, followed by Phase Condition III, etc. This will be true at each different installation, and thus each surveillance system in a multisystem location will, although being independent from the others in all other ways, be synchronized together nonetheless.

Referring once again to the circuit shown in FIG. 8, it should be noted that the various coil-excitation circuit branches 31–34 inclusive, in which the oscillating currents at resonance characterize the oscillating electromagnetic field conditions produced by the associated inductor (coil), are themselves interconnected by coupling transformers designated T1–T6 inclusive, transformers T1 and T2 being coupled between drive circuit branches 31 and 32, coupling transformers T3 and T4 being coupled between drive circuit branches 33 and 34, and coupling transformers T5 and T6 being coupled between drive circuit branches 31 and 33. Each such coupling transformer may be a trifilar-wound toroid, for example having sixteen turns of No. 17 wire and providing a coupling factor on the order of 0.9999, with inductance on the order of about 2 millihenries. As illustrated, the primary winding of each such coupling transformer is connected into the series coil-excitation circuit, while the secondary and tertiary windings are connected in separate oppositely-phased loops controlled (opened or closed) by back-to-back pairs of FETs which are designated (in the loop 36 between circuit branches 31 and 32) 40, 41 and 44, 45; in the loop 37 interconnecting circuit branches 31 and 33, 48, 49 and 52, 53; and in the loop 38 interconnecting circuit branches 33 and 34, 56, 57, and 58, 59. As illustrated in FIG. 8, the junction of each of the paired FETs is connected to ground, while the gate electrode of each such pair is connected together and coupled to a switch drive whose equivalent circuits are shown separately and designated by the numerals 60, 62, and 64, of which drive 60 and drive 62 are coupled together and controlled at a logic input designated "B", while switch drive 62 has its input controlled from a complementary logic input labeled "A".

The coupling coil system just described is provided for the purpose of making current and phase conditions the same in all four of the field-excitation coils 16, 18 and 116, 118 and in their respective associated drive circuits 31–34 inclusive. That is, it is very desirable to have the same circulating current level and also the same phasing, or at least the same zero-crossing point (i.e., either directly in phase, or directly out of phase, depending upon the particular phase condition involved) which parameters, in accordance herewith, are sometimes referred to by use of the expression "current flow conditions". In essence, the primary windings of each of the coupling transformers comprise current-sense coils, which reflect and which may control the phase, frequency and magnitude of the circulating current present in their particular coil-excitation circuit branch. Thus, with due regard for the winding direction of the transformer coils involved (as illustrated by the dots at the various ends of the coupling transformers) the secondary and tertiary windings are connected into operation in specified sequences coordinated with the field coil drive excitation timing and phasing. This is accomplished by appropriate gating signals applied to the control FETs 40, 41, etc., and during the interval each of the particular circuits involved is actively coupled into operation, it is in effect made part of a single composite current transformer. Since, on an instantaneous basis, current into a current transformer must equal current out of it, either directly in phase or directly out of phase, the various currents flowing in the respective windings of the different coupling transformers are forced to equalize, due to the voltages developed across the windings, and the phases (that is, zero-crossings and maxima) of the circulating currents are also forced into balance, i.e., "current flow characteristics" are brought into direct synchronization.

Therefore, the overall effect of the coupling transformers T1–T6 is to force all of the field-generating coils in a system to operate in direct synchronism with one another, and also to operate at identical current levels. In this manner, the inherent slight mismatches between the inductances in the various drive circuit branches, or between the capacitances in them, or whatever such mismatches or disturbances as may exist in the actual implementation and operation of a system, are equalized and compensated. In cases where no such mismatches exist, no voltage differences will exist, and no energy will be transferred, from one such drive circuit branch to the other through the coupling transformers, but in reality at least some miniscule such mismatches or imbalances are likely to inherently be present, or to occur during system operation due to spontaneous environmental conditions. Wherever any such mismatch occurs, there will be energy transfer from one drive circuit branch to another, to the extent required to equalize circuit operation (current) in each. Of course, the desired goal is to have each of the circuit branches very closely matched in any event, so that little or no energy is transferred between them through the coupling transformer system. Whatever the situation may be, it will be appreciated that the coupling transformer circuits typify the concept of a comprehesive correction or compensating means for detecting mismatch and imbalance in the field coil drive circuits and automatically correcting the same, to achieve balanced coil drive circuits by automatically correcting the same, and thereby achieve steadily-balanced coil drive operation on a continuous basis. In so doing, the individual coupling circuits may either inject energy into or take energy out of a given coil drive circuit, so as to balance it with the others by in effect applying difference signals between any imbalanced coils. In this connection, it should be noted that the concept involved could be implemented in other ways, for example by using sensing coils wound over the field-drive coils to provide the circuit access. Of course, switched inputs and outputs could also be utilized, as could other types of balancing networks.

As indicated above, all of the switching required to appropriately open and close the various coupling transformer loops in a manner corresponding to the phasing illustrated in FIGS. 3(*a*), 3(*b*), and 3(*c*) is accomplished by supplying logic switching inputs to terminals A and B. In FIG. 8, the phasing and transformer winding sense indicated by the dots at one end or the other of the various transformer coils, together with the logic state of the input supplied to the various switching FETs 131, 231, etc., will produce the current flow directions indicated by the arrows in each of the coil-excitation circuit branches and in each of the coupling transformer loops. Upon due consideration, this may be seen as producing Phase Condition III, illustrated in FIG. 3(*c*). With respect to driver phasing, or logic, it will be noted that each of the drive sources indicated as being applied to the gates of the FETs in the various coil excitation loop branches may also be the same as those applied to the logic inputs A and B, or may at least be controlled from a common driver. Additionally, the "B+" applied to each of the coils in a given system may be taken from a common source, and that source may also be controlled as to output level by a system controller. In the most preferred embodiment, each panel may have its own power supply as well as its own timer or controller, for all of the coils in that panel, and each such power supply should be controllable, by the controller for that panel. In turn, the various panel controllers should be under the control of a master controller (microprocessor).

A further point of explanation with respect to the particular system depicted for purposes of illustration in the Figures herein is that the two-panel embodiment illustrated is merely one of many possible configurations, i.e., a system with two passages for egress or entry may be implemented by using three adjacent panels, three passages would have four adjacent panels, etc. In each case, the coupling and interconnection from one panel to the next would be essentially the same as that illustrated, i.e., all of the different field-generation coils in all of the different panels would be coupled together for uniform operation, in the same general manner as that discussed above. More particularly, FIG. 8 illustrates the interconnections for two panels, each having upper and lower coils coupled together in the manner described, with the upper coils also being intercoupled, for uniform operation of all four of the coils in both panels. In an analogous three-panel system, the two coils of the third panel would be coupled together in the same general manner as the two coils of either of the panels illustrated in FIG. 8, and one or the other of the coils in the third panel would be coupled back to one or the other of the coils in the second panel, by use of the same type of coupling transformer circuitry. In order to enhance uniform circuit configuration, a preferred such coupling would be to utilize the lower such field-generation coils on the first panel and couple it to the upper coil on the adjacent panel. That is, by adding the primary winding of an additional coupling transformer in series within drive circuit branch 34, the latter would then have two coupling transformer primary windings just as is the case in both circuit branches 31 and 33. That additional coupling transformer would then be coupled in the same manner over to the drive circuit branch for the upper field coil in the adjacent panel. Accordingly, a multiple-panel system containing practically any realistically desirable number of passages for egress or ingress would in effect comprise a cascaded chain of the individual coils, in effect coupled one to the other in a long series chain. In such a cascaded chain, all of the field generation coils would then have currents of essentially equal magnituded, whose zero-crossings were essentially simultaneous.

A further component percent in the circuit of FIG. 8 is a current-sense transformer 17, shown coupled into the drive circuit branch 32 for purposes of illustration. In an actual sense, such a component could be coupled into any of the drive circuit branches, or for that matter into all of the drive circuit branches. In a particular example, current sense transformer T7 may be a single-turn primary winding which is actually connected in series in drive circuit branch 32, with a secondary winding having on the order of 200 turns shunted by a resistor R7 connected to ground, thus providing a current sense output terminal designated by the numeral 70. The current sense transformer T7 is in fact a current transformer, whose purpose is to act as a detecting coil or pickup, to provide a signal whose amplitude is proportional to the amplitude of the circulating current present in drive circuit branch 32. Due to the action of the coupling transformers T1–T6 inclusive, the detected level of the current in circuit branch 32 will also be indicative of the circulating current in each of the resonant drive circuit branches 31, 32, 33, and 34.

The current sense output thus provided on terminal 70 is utilized for two purposes; first, it provides a direct measure of the level of the circulating currents in the series resonant drive circuits, and thus may be used as a feedback signal to control the level of the "B+" supplies feeding each of the resonant series circuits. In this manner, regulated drive currents for controlled steady-state oscillation may be achieved, and it is also possible to attain system resonance in a much more rapid manner than would normally be true. That is, the B+ supply voltage used at start-up for each new phase condition may be set at a much higher "boost" level than that of the normal, steady-state supply; alternately, a supplemental higher-output source may be used, switching the same into the out of operation at the desired times. The latter arrangement is illustrated in FIG. 8, in which the supplemental source "V-Boost" is shown as being applied additively with the normal "B+", through switches labeled "$S_B$", which are also preferably power FETs, configured similarly to the B+FETs 131, 231, etc. In a particular example of the boost voltage, with a steady-state B+ supply level at about twenty volts, the boost voltage at start-up may instead be on the order of 120 volts, applied only for the interval necessary to bring the circulating currents up to the full oscillatory level, which may be determined by monitoring the output from transformer T7 appearing on terminal 70. While a tapering, continuously-controlled wide-range B+ supply could thus be used, due to the capabilities provided by the feedback circuitry, it is found that in fact by starting with a boost voltage of the 120 volt magnitude just indicated, full resonance will be rapidly achieved due to the high-Q of the circuit, and the supply may simply be dropped to a lower sustaining level after a few cycles (e.g., five) on an open loop basis.

A rapid quenching or quieting of the field coil oscillations at the end of each successive phase condition is also very desirable, in order to maximize the period of steady-state oscillation. The supplemental switched source arrangement noted above and shown in FIG. 8 has particular advantage in this regard, since this not only allows use of a relatively simple boost supply but also promotes rapid quenching of field coil oscillation while also providing desirable efficiency enhancements. That is, in order to achieve rapid quenching, it is only necessary to open the power FETs controlling both the steady-state B+ and the boost source V-Boost. In so doing, not only is the positive-polarity voltage from the source disconnected, but in addition the inherent back-biased diodes in the FETs in effect create an inverse square wave by using the natural circulating currents flowing in the coils. Thus, circuit oscillations are driven down very rapidly, in essentially the same short time as it takes to achieve boosted oscillation in the first place. At the same time, the drive-down energy is actually routed back to the sources (i.e., both the B+ and V-Boost sources) to further enhance circuit efficiency. Rapid quenching is thus achieved without actually creating or separately applying an inverse square wave drive-down signal, and the circulating currents in the coils are utilized productively while their energy is also returned to the supply sources. This is accomplished merely through use of normaly reverse-biased diodes in the lines from the sources, which are inherently present where the preferred FETs are used as switches.

The second purpose for the output 70 from current sense transformer T7 is analogous to that just stated, but has application to the actual phase condition present in the series resonant circuit. Thus, the zero-crossings indicated by the current sense output are indicative of those present in the series resonant circuit, and by using this signal as a phase condition feedback the indicated phase may be compared with the actual phase of the FET driver signals generating the square wave drive excitation. In the event of error, i.e., phase differences indicating drive at other than exact resonance, suitable frequency correction may readily be made.

Figure 11:
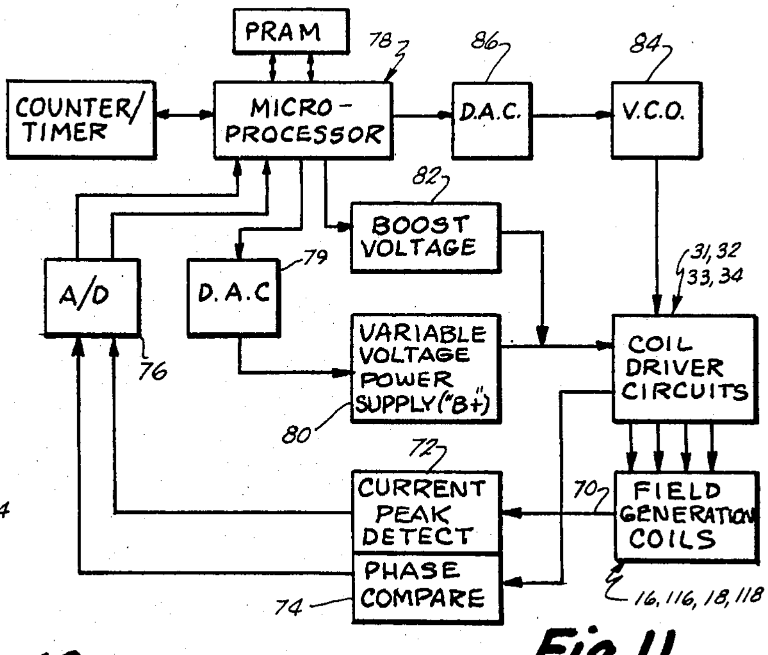
FIG. 11 is a system block diagram generally illustrating the overall nature of the preferred coil-driving and control circuitry in accordance herewith.

More particularly with respect to the power supply level control and phase-correction, or frequency-correction, as referred to above, a generalized illustration of a preferred implementation is shown in FIG. 11. Referring to the latter, the current sense output from terminal 70 of transformer T7 is shown coupled back through a peak-detector 72 and phase comparator 74, and through an A/D converter 76, to a system controller (e.g., microprocessor) 78 which is used to produce control signals for drive amplitude as well as frequency, that is, the amplitude of the drive excitation applied to the drive circuit branches, and the frequency of the switching signals applied to the FETs which "chop" that applied excitation. Microprocessor control of the amplitude of the B+ supply (designated 80 in FIG. 11) in conjunction with the high-level "boost" start-up (and/or "drive-down") drive procedure described above will be readily understood. That is, a "boost voltage" source 82, having a predetermined high leve, may be placed directly under microprocessor control, to be switched on and off, (and/or even reversed in polarity for faster drive down, if desired), by the microprocessor (acting through a D/A converter 79) at whatever times and for whatever periods the microprocessor may be programmed, e.g., the first and/or last half-dozen pulses of the coil drive excitation during each new phase condition (the timing and duration of which are all controlled by the microprocessor in any event). When switched on, the boost voltage from source 82 may merely override the normal steady-state excitation from the variable source 80, which should be applied through a diode which is reverse-biased closed by the higher voltage to drive up the energy level of the resonant circuit very quickly. Upon completion of the preprogrammed number of cycles of boost drive, the boost supply 82 is merely switched off by the microprocessor, leaving the source 80 to forward-bias the aforementioned diode and drive the field coils sufficiently to maintain steady-state oscillation. It is desirable to control source 80 during such steady-state conditions, by using the current-sense output 70 as a feedback signal to the microprocessor, so that the latter may vary the output of source 80 in accordance with requirements indicated by the level of the circulating currents sensed and outputted on line 70. One good way of doing this is by peak-detecting the sensed current on line 70; hence, the peak-detector 72 shown. Of course, this procedure could also be utilized to continuously control a widely-variable power supply, from a high initial "boost" value to (and during) the lower "run" value.

It is contemplated that the driver frequency applied to the power FETs be generated by use of a voltage-controlled oscillator, indicated in FIG. 11 at 84, controlled by the microprocessor 78 through a D/A converter 86 as a function of the current sense output 70. In this manner, the frequency of the drive pulses applied to each of the series resonant circuits will always be maintained at the actual frequency of circuit resonance. That is, the current sense output 70 may be compared to the phase of the drive frequency being applied to the drive circuits, as by the "phase comparator" 74, and an error signal representative of any detected difference in the respective zero-crossings may be inputted to the microprocessor 78 via the A/D converter 76, to cause an appropriate correction by the control applied to the V.C.O. 84. In further view of the operation of the coupling coils, discussed above, it will be appreciated that the resulting operation is exceedingly stable, as well as exceedingly accurate; thus little correction to either the level or the phase of the applied drive is likely to be necessary as a general matter. Imbalances and diruptions caused by spontaneous ambient conditions may of course occur, but these are also quickly damped out due to the coupling effects. As an end result, detection accuracy is substantially enhanced.

It should be noted that, as a still further refinement in the application of the square wave excitation to the coil drive circuits, the aforementioned microprocessor controller 78 may desirably be programmed to re-set the output frequency from V.C.O. 84 at the start of each successive new phase condition of coil excitation so that it starts that phase at the particular frequency required for oscillation in that particular phase condition (bearing in mind that the difference mutual inductances encountered in each such different situation will change the resultant resonant frequency). This may be accomplished by using a count, or word, retained in memory, whose value identifies either the anticipated or the actual frequency of oscillation for the next ensuing phase condition. For example, upon completing a Phase Condition I and upon commencing the next succeeding Phase Condition II, the microprocessor should have available a digital signal in memory corresponding to the ancitipated drive frequency to be applied to the field coils during steady-state resonant operation in Phase Condition II. By using such a signal as the basis for setting the actual square wave frequency to be applied to the drive circuits during the next ensuing Phase Condition II, it is much more likely that such drive signal will from the very beginning be very close to that needed to produce steady-stated resonant oscillation during the Phase Condition II about to commence. Of course, the same is true with respect to each successive change in phase condition, i.e., a different signal is stored in memory for each different phase condition, each to be used as a basis for initial setting of the drive frequency to be applied at the start of each change in phase condition. These stored command signals may be predetermined on the basis of actual measured oscillation frequencies, or the stored values could be continuously updated using the actual feedback controlled V.C.O. set signal from the previous cycle of operation in that phase condition. In this manner, much greater consistency is achieved with much less feedback-controlled change required, all of which in the end substantially enhances detection and analysis accuracy.

Figure 9:
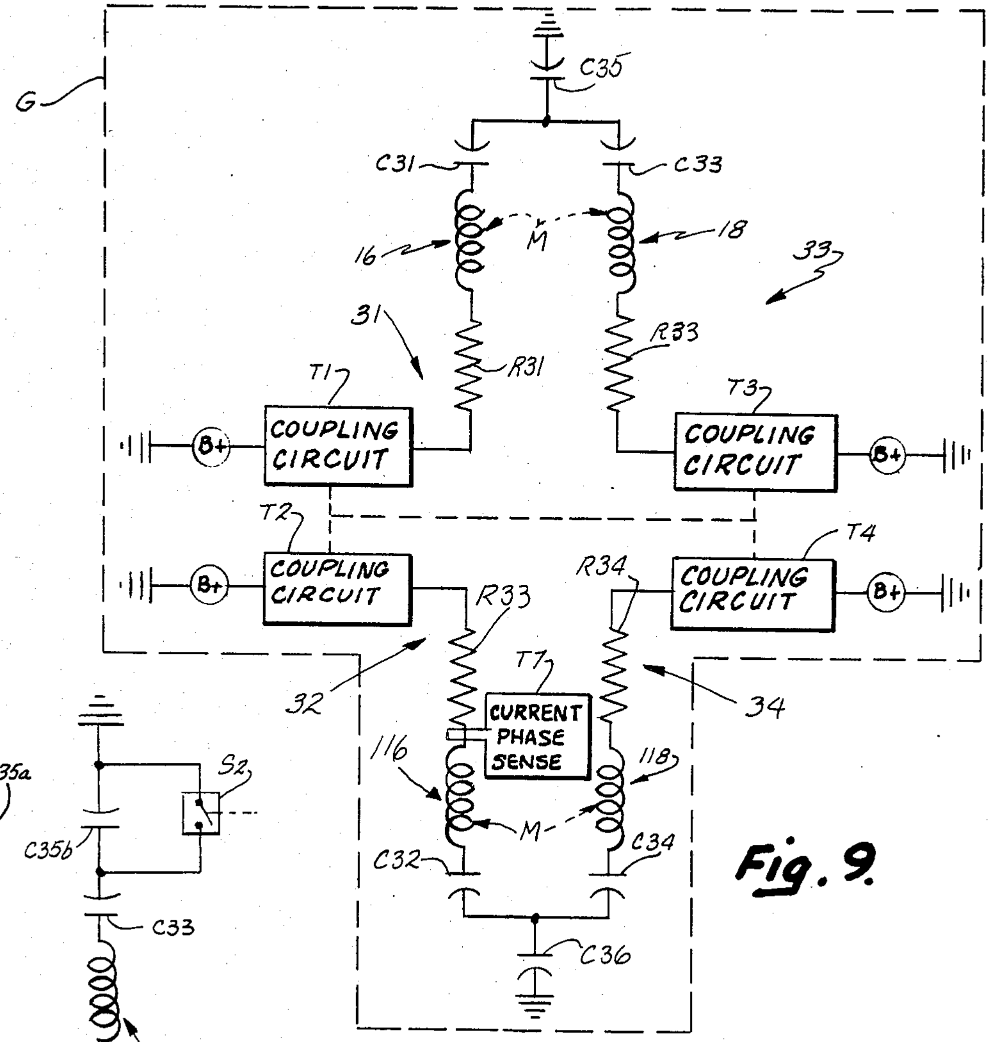
FIG. 9 is a simplified schematic diagram based upon FIG. 8 but showing alternative and improved features therefor.
Figure 10:
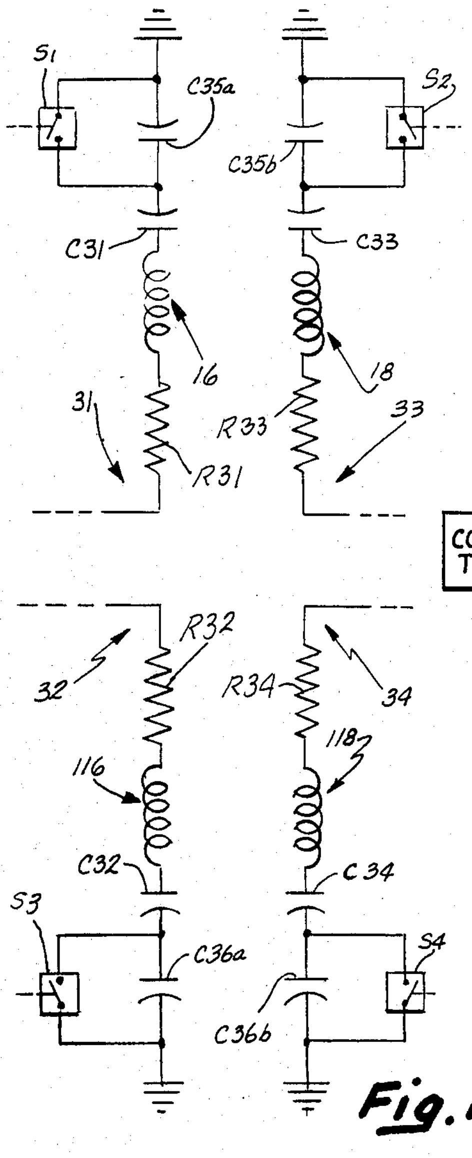
FIG. 10 is a further simplified schematic diagram analogous to FIG. 9 but showing the general principle involved.

An additional enhancement for the drive circuitry of FIG. 8, in accordance with the most preferred embodiments of the invention, is illustrated in FIGS. 9 and 10, both of which show simplified versions of the overall circuit illustrated in FIG. 8. Referring first to FIG. 9, it is to be noted that the capacitors in corresponding pairs of the series-resonant drive circuits 31–33 and 32–34, respectively are connected together at which was previously their grounding terminal, and the resulting common point is connected to ground through an additional capacitor, designated C35 and C36, respectively. The inherent interconnection of all ground points is indicated by the dashed line designated "G". The principle involved in this arrangement is illustrated in FIG. 10, which is basically the same as FIG. 9 but which utilizes an additional, independent grounding capacitor C35(*a*), C35(*b*), and C36(*a*), C36(*b*) instead of the commonly-shared capacitors C35 and C36 of FIG. 9. In the circuit of FIG. 10, the additional, independent capacitors just described are each shunted by a switch $S_1$, $S_2$, $S_3$, and $S_4$, each of which should be understood as being remotely controllable and which, although drawn in a simple, generic style, should of course be understood as being any state-of-the-art switch.

Briefly stated, the purpose of the circuit variations depicted in FIGS. 9 and 10 is to help offset the shift in the resonant frequency of the different drive circuit branches as a result of the different mutual inductance effects occurring during the different drive phase conditions (hence, the "M" coupling indicated between each pair of field coils). This is accomplished in the indicated manner due to the fact that the additional capacitors are actually in operation only during one of the two possible current-flow directions, namely, when either of the two oppositely-aligned coils (e.g., coils 16 and 18, or coils 116 and 118) are driven in phase with one another. That is, when two such coils are driven out of phase there will be equal and opposite currents through the series-resonant capacitors and to ground in one instance while from ground in the other instance. With the ground side of both such capacitors connected together, as illustrated in FIG. 9, the circuit point at their junction will thus have a net current flow of zero under the condition of excitation; therefore, if an additional capacitor is connected from that point to ground, such capacitor will not have any active operation in the circuit performance. On the other hand, when the two such currents are in phase, the additional capacitor will have an effect, since the net current flow at the circuit point in question is no longer zero, but is in effect twice the magnitude of each of the two equal currents in the opposite circuit branches.

Accordingly, the effect will be to add capacitance to each drive circuit where the two energizing currents are in phase, without adding such capacitance to the circuits when the two currents are out of phase. The net result is a difference in the effective resonant frequency of the circuits for the two different excitation conditions, such difference being of a nature which reduces the frequency shift which otherwise would be present strictly as a result of the different mutual inductances created as a result of the different excitation phase conditions. Thus, the oscillation frequencies of the field coils are made to be more nearly the same in each of the different phase conditions.

The desired result noted above may also be achieved in other ways, and the switching circuit arrangement shown in FIG. 10 is illustrative of one such way. In such a circuit, the various switches $S_1$–$S_4$ inclusive will, when closed, short out the additional capacitance; thus, by logical control of the switches, the same effect as noted above may be obtained. That is, with the same logical switching used to produce the differing coil drive phase conditions and coupling transformer connections described above, the switches $S_1$–$S_4$ may similarly be controlled to in effect add and subtract capacitance as desired in different phase conditions. Basically, the higher of the resonant frequencies for the different conditions of coil excitation phasing will remain the same, while the lower frequencies caused by the different mutual inductances created will be raised toward the nominal higher frequency level. This is a very desirable effect, notwithstanding the compensating and balancing measures discussed above, including the coupling transformer circuits as well as the current feedback-microprocessor control arrangement described. In this manner, with more nearly uniform circuit and coil operation in all of the different phase conditions, there will be less power consumption in the form of losses experienced, and perhaps even more importantly, the detection and analysis which is the end result of the surveillance system will be significantly enhanced. One fundamental such consideration is the basic fact that the higher the frequency of resonance, the more cycles of field perturbation sample will be available for analysis per unit of real time. Additionally, it is very beneficial to maintain sampling and analysis at a more continuous, constant repetition rate, which may be better understood and further appreciated by reference to copending application Ser. No. 673,015, to which reference is made.

It is to be understood that the above is merely a description of a preferred embodiment of the invention and that various changes, alterations and variations may be made without departing from the underlying concepts and broader aspects of the invention as set forth in the appended claims, which are to be interpreted in accordance with the established principles of patent law, including the doctrine of equivalents.

The embodiments of the invention in which an exclusive property or privilege is claimed are defined as follows:

1. A method of applying controlled electrical excitation to the field-generating coil windings in an alternating electromagnetic field-type surveillance system, comprising the steps: generating an alternating electromagnetic surveillance field across a surveillance passage by using at least a pair of inductance coils; applying electrical excitation to said coils by coupling a power supply means thereto through an electrical drive circuit for each of said coils; monitoring at least one of the current flow characteristics constituting circulating current maxima and phasing present in at least one of said drive circuits and producing a control signal representative thereof; and variably controlling the electrical excitation applied to at least selected ones of said coils in response to and as a function of said control signal so as to conform the actual current flow in such selected coils to a substantially uniform characteristic.

2. The method of claim 1, wherein said representative control signal comprises a feedback signal coupled back to said power supply means, and including the step of using said control signal to variably control the output of said power supply means.

3. The method of claim 2, wherein said electrical excitation applied to said coils includes pulsations, and including the step of controlling said coil excitation by controlling said power supply means to change the position with respect to time of the pulsations in the coil excitation provided by said power supply means.

4. The method of claim 3, wherein said power supply means is controlled by changing the frequency of a pulsating output produced thereby.

5. The method of claim 2, including the step of using said feedback signal to variably control said power supply by changing the magnitude of the output supplied thereby.

6. The method of claim 5, wherein said step of variably controlling said power supply output magnitude is carried out in a manner to decrease the magnitude of the pulsating electrical coil excitation from a high level start-up magnitude to a substantially lower level sustaining magnitude.

7. The method of claim 5, wherein said feedback signal is used to variably control said power supply means by shifting the position with respect to time of the pulsations comprising said coil excitation.

8. The method of claim 1, wherein said steps of monitoring said current flow characteristics and producing a signal representative thereof includes linking at least said selected ones of said field-generating coils together and substantially equalizing the circulating currents flowing in each.

9. The method of claim 8, including the steps of using at least a pair of field-generation coils on at least one side of said passage to produce a composite surveillance field therein, linking said coils together, and conforming the circulating currents flowing in each.

10. The method of claim 9, including the steps of using at least a pair of field-generation coils on both opposite sides of a surveillance passage to produce a composite surveillance field therein, and effectively linking all of said coils together to conform the circulating currents flowing in each.

11. Apparatus for applying drive excitation to the alternating-field-generating coils of an electromagnetic field-type surveillance system, comprising in combination: source means for supplying electrical drive excitation for energizing said coils to generate an electromagnetic interrogation field; a separate and individual series-type electrical drive circuit for each of said coils, each such circuit connecting one such field-generating coil in series with at least one capacitance; each of said series-type drive circuits comprising a series-resonant LC circuit having capacitance and inductance, including the inductance of the field-generating coil connected in that circuit, whose relative values produce series resonance at a frequency which generally corresponds to the desired frequency of alternation for the interrogation field; and a plurality of separately-controllable switch means, including at least one such switch means for separately connecting each of said series-type drive circuits to said source, such that said interrogation field is produced by each of said coils under separately-controlled excitation from said source.

12. Apparatus as defined in claim 11, wherein each of said switch means for separately connecting each of said series-type drive circuits to said source comprises means for changing the effective direction of the current flow through its corresponding series-type drive circuit with respect to the effective direction of current flow in other such drive circuits.

13. Apparatus as defined in claim 12, and including a switch actuator coupled to each of said switch means and providing a varying command thereto for controlling the switching operation thereof.

14. Apparatus as defined in claim 13, wherein said switch actuator comprises a variably-controllable signal-generating device, and a feedback-responsive closed-loop control apparatus for sensing circulating currents in at least one of said coils and controlling the operation of said signal-generating device as a function of the sensed coil current.

15. Apparatus as defined in claim 14, wherein said control apparatus detects coil oscillation frequency and controls the output frequency of said signal-generating device as a function of detected coil oscillation frequency.

16. Apparatus as defined in claim 12, and including controllable means for varying the magnitude of the excitation from said source which is applied to said drive circuits.

17. Apparatus as defined in claim 16, including controllable means for separately varying the magnitude of the excitation from said source which is applied to each of said drive circuits.

18. Apparatus as defined in claim 16, and including a switch actuator coupled to said switch means and providing a varying command thereto for actuating the switching operation thereof.

19. Apparatus as defined in claim 18, wherein said switch actuator comprises a variably-controllable signal-generating device, and a feedback-responsive closed-loop control apparatus for sensing circulating currents in at least one of said coils and controlling the operation of said signal-generating device as a function of the sensed coil current.

20. Apparatus as defined in claim 19, wherein said control apparatus detects coil oscillation frequency and controls the output frequency of said signal-generating device as a function of detected coil oscillation frequency.

21. Apparatus as defined in claim 11, wherein predetermined ones of said series drive circuits are connected together at a common node located at a point which leaves the said inductance and capacitance of each such circuit connected together in series, and including an additional capacitance connected between said common node and the circuit ground, for shifting the resonant frequency of the interconnected drive circuits to compensate for mutual inductance effects due to particular phase conditions of the applied excitation.

22. Apparatus as defined in claim 11, wherein at least certain of said drive circuits include at least one secondary capacitive element and circuit means for operatively switching such element into and out of conduction in a manner shifting the effective resonant frequency of such drive circuits to compensate for mutual inductance effects due to particular phase conditions of the applied excitation.

23. Apparatus as defined in claim 12, wherein said separately-controllable switch means comprises a power FET device.

24. Apparatus as defined in claim 23, wherein each of said switch means comprises a pair of FET devices connected together in series back-to-back configuration between said source and a circuit ground reference point, said series drive circuit being connected to the junction of said two FET devices.

25. Apparatus as defined in claim 24, wherein said switch actuator comprises a variably-controllable signal-generating device coupled to the control gate of said FET devices to switch such devices on and off.

26. Apparatus as defined in claim 25, including a feedback-responsive closed-loop control apparatus for sensing coil oscillation frequency and controlling the output frequency of said signal-generating device as a function of the sensed coil oscillation frequency.

27. Apparatus as defined in claim 11, and including means for monitoring the frequency of electrical oscillation in at least one of said coils and means for synchronizing pulsations in the drive excitation applied to such coil with the monitored oscillation frequency in such coil.

28. Apparatus as defined in claim 27, and including means for sensing the magnitude of the oscillating current flow in said coil, and means for varying the magnitude of the drive excitation pulsations applied to the drive circuit for such coil in response to the sensed oscillation current magnitude.

29. Apparatus as defined in claim 27, wherein said drive excitation pulsations comprises pulses having a generally rectangular wave shape, and including means for maintaining the width of said drive pulses substantially the same as the half-cycle time of the monitored coil oscillation frequency.

30. Apparatus as defined in claim 29, and including means for sensing the magnitude of the oscillating current flow in said coil, and means for varying the magnitude of the drive excitation pulsations applied to the drive circuit for such coil in response to the sensed oscillation current magnitude.

31. Apparatus as defined in claim 29, wherein said synchronizing means operates to set the occurrence of said drive excitation pulses at the occurrence of at least certain of said half-cycles of coil oscillation, to thereby place such pulses and half-cycles substantially in time coincidence with one another.

32. Apparatus as defined in claim 31, and including means for sensing the magnitude of the oscillating current flow in said coil, and means for varying the magnitude of the drive pulsations applied to the drive circuit for such coil in response to the sensed oscillation current magnitude.

33. Apparatus as defined in claim 31, including means for maintaining the timing of said drive pulsations substantially synchronized with the monitored coil oscillation frequency, such that individual drive pulsations are applied substantially simultaneously with half-cycles of coil oscillation.

34. Apparatus as defined in claim 33, and including means for sensing the magnitude of the oscillating current flow in said coil, and means for varying the magnitude of the drive pulsations applied to the drive circuit for such coil in response to the sensed oscillation current magnitude.

35. Apparatus for generating an alternating electromagnetic interrogation field in an area surveillance system, comprising in combination: at least a pair of inductance coils spaced opposite from one another across a surveillance area; a source of electrical excitation for driving each of said coils in field-generating oscillation; a plurality of individual drive circuits, each such circuit separately coupling said source to a different one of said coils, for separately applying said excitation to said coils; means for monitoring current-flow conditions in at least certain of said coils during field-generating oscillation and for providing a control signal representative of predetermined such current-flow conditions; and means for varying the coil-driving excitation applied to at least certain of said coils as a function of said control signal, to thereby closely coordinate and balance the field-generating operation of the different coils on the basis of said predetermined current-flow conditions.

36. The apparatus of claim 35, and including synchronous switching means for periodically changing the effective direction of current flow in at least selected ones of said field-generating coils from the direction previously existing therein to an opposite direction to thereby change the composition of the magnetic flux in the field, and for applying pulsations of drive excitation to the coils receiving changed current-flow direction in synchronism with pulsations of drive excitation applied to other coils.

37. The apparatus of claim 36, wherein said synchronous switching means is arranged to maintain the occurrences of the drive excitation pulsations which are applied to coils with changed current-flow direction substantially in unison with the occurrences of the drive excitation pulsations which are applied to other coils.

38. The apparatus of claim 37, and including means for coupling said source of coil-driving excitation to an a.c. line supply, and means for synchronizing the switching operation of said switching means with the frequency of alternation of the applied a.c. line.

39. The apparatus of claim 38, wherein said switching means is adapted to make said periodic changes in coil current-flow direction in synchronism with the timing of individual cycles of alternation of the applied a.c. line.

40. The apparatus of claim 35, wherein said source provides pulsating coil-driving excitation, and including means for monitoring the frequency of oscillation of at least certain of said drive circuits during coil-driving operation thereof and means for synchronizing the pulsation rate of the coil-driving excitation from said source with the monitored oscillation frequency of said certain drive circuits.

41. Apparatus as defined in claim 40, and including means for varying the amplitude of said drive excitation in relation to said coil drive circuit current flow conditions as a function of said control signal.

42. Apparatus as defined in claim 40, wherein said drive excitation pulsations comprise pulses having a generally rectangular wave shape, and including means for maintaining the width of said pulses substantially the same as the half-cycle time of the monitored coil drive circuit oscillation frequency.

43. Apparatus as defined in claim 42, and including means for varying the amplitude of said drive excitation pulses in relation to said coil drive circuit current flow conditions as a function of said control signal.

44. Apparatus as defined in claim 42, wherein said synchronizing means sets the occurrence of said generally rectangular pulses in accordance with the occurrence of at least certain of said half-cycles of coil drive circuit oscillation, to thereby place such pulses and half-cycles in timed relation with one another.

45. Apparatus as defined in claim 44, and including means for varying the amplitude of said drive excitation pulses in relation to sensed coil drive circuit current amplitude.

46. Apparatus as defined in claim 44, including means for maintaining the repetition rate of said generally rectangular pulses substantially the same as the monitored coil oscillation frequency, such that said pulses are applied to said coils substantially in unison with half-cycles of the oscillating current flow in the coils.

47. Apparatus as defined in claim 46, including means for sensing coil oscillation circulating current magnitude, and means for varying the magnitude of the applied coil drive excitation in relation to the sensed circulating current magnitude.

48. The apparatus of claim 35, wherein said means for monitoring current-flow conditions in at least certain of said drive circuits during their coil-driving operation comprises at least one additional coil coupled to at least one of said drive circuits.

49. The apparatus of claim 48, wherein said additional coil comprises at least one transformer winding which is electrically connected into said drive circuit to receive at least a portion of the current flow present therein.

50. The apparatus of claim 49, wherein said transformer comprises a coupling transformer, and further including at least one additional coupling transformer having a winding electrically connected into another of said drive circuits, each of said coupling transformers having at least one additional winding and including circuit means interconnecting said additional windings to thereby interconnect said coupling transformers and thus couple said drive circuits together for balanced operation of their respective field-generating coils.

51. The apparatus of claim 50, wherein said means for monitoring current-flow conditions further includes at least one current transformer having a primary winding connected into one of said drive circuits and a secondary winding connected into a feedback circuit to provide a feedback signal which is a function of current flow in said one drive circuit.

52. The apparatus of claim 51, and including means for receiving said feedback signal and for varying the magnitude of the pulsating excitation applied to the field-generating coils of those drive circuits of which said feedback signal is representative, as a function of said feedback signal.

53. The apparatus of claim 51, and including means for receiving said feedback signal and for varying the timing of the pulsating excitation applied to the field-generating coils of the drive circuits of which said feedback signal is representative, as a function of said feedback signal.

54. The apparatus of claim 50, and including means for receiving said feedback signal and for varying the frequency of the pulsating excitation applied to those field-generating coils of the drive circuits of which said feedback signal is representative, as a function of said feedback signal.

55. The apparatus of claim 54, and including means for receiving said feedback signal and for varying the magnitude of the pulsating excitation applied to the field-generating coils of those drive circuits of which said feedback signal is representative, as a function of said feedback signal.

56. The apparatus of claim 48, and including synchronous switching means for periodically changing the effective directions of current flow in at least selected ones of said field-generating coils from the direction previously existing therein to an opposite direction, to thereby change the composition of the magnetic flux in the field; said switching means maintaining the pulsations of drive excitation applied to those coils receiving changed current flow direction in synchronism with the pulsations of drive excitation applied to other coils.

57. The apparatus of claim 56, and including means for coupling said source of coil-driving excitation to an a.c. line supply, and means for synchronizing the switching operation of said switching means with the frequency of alternation of the applied a.c. line, and wherein said switching means is adapted to implement said periodic changes in coil current flow direction in synchronism with the timing of individual cycles of alternation of the applied a.c. line.

58. The apparatus of claim 57, wherein said coil comprises at least one transformer winding and is electrically connected into said drive circuit to receive at least a portion of the current flow present therein, and wherein said transformer comprises a coupling transformer, and further including at least one additional coupling transformer having a winding electrically connected into another of said drive circuits, each of said coupling transformers having at least one additional winding and including circuit means interconnecting said additional windings to thereby interconnect said coupling transformers and thus couple said drive circuits together for balanced operation of their respective field-generating coils.

59. The apparatus of claim 57, wherein said means for monitoring current-flow conditions further includes at least one current transformer having a primary winding connected into one of said drive circuits and a secondary winding connected into a feedback circuit to provide a feedback signal which is a function of current flow in said one drive circuit.

60. A method of energizing the field-generating coils in an area-surveillance system of the type which uses spaced oppositely-disposed such coils to generate an alternating electromagnetic surveillance field in the area between such coils, said method comprising the steps of using a separate individual drive circuit to separately energize each such field-generating coil and drive the same into oscillatory electrical conduction, correlating the operation of said separate drive circuits so that each functions to drive its associated field-generating coil conjointly with the driving of the other such coils, generally in accordance with a predetermined mutual field-generating relationship; and balancing the electromagnetic field components produced by the respective coils by transferring energy from one of said drive circuits to another thereof.

61. The method according to claim 60, wherein said step of balancing electromagnetic field components is carried out by linking one such drive circuit to another through interconnecting circuitry distinct from excitation supply circuitry.

62. The method according to claim 61, wherein said step of balancing electromagnetic field components is carried out by sensing the circulating currents flowing in each such drive circuit and implementing corresponding increases and decreases therein to conform such currents into a predetermined mutual relationship.

63. The method according to claim 62, wherein said steps of sensing currents and implementing corresponding increases and decreases is carried out by using coupling transformer means interconnecting the corresponding drive circuits.

* * * * *

UNITED STATES PATENT AND TRADEMARK OFFICE
CERTIFICATE OF CORRECTION

PATENT NO. : 4,634,975 Page 1 of 2

DATED : January 6, 1987

INVENTOR(S) : Larry Eccleston et al.

It is certified that error appears in the above-identified patent and that said Letters Patent is hereby corrected as shown below:

Column 1, line 52:
"fpeaking" should be -- speaking --.

Column 2, line 43:
"relatinships" should be -- relationships --.

Column 3, line 14:
"typically" should be -- typical --.

Column 4, line 5:
"facors" should be -- factors --.

Column 6, line 16:
"noentheless" should be -- nonetheless --.

Column 17, line 21:
after "both" delete -- to --.

Column 17, line 59:
"amount" should be -- moment --.

Column 18, line 48:
"hereintofore" should be -- heretofore --.

Column 23, line 14:
"magnituded," should be -- magnitudes, --.

Column 23, line 16:
"percent" should be -- present --.

Column 23, line 17:
"transformer 17" should be -- transformer T7 --.

UNITED STATES PATENT AND TRADEMARK OFFICE

CERTIFICATE OF CORRECTION

PATENT NO. : 4,634,975 Page 2 of 2

DATED : January 6, 1987

INVENTOR(S) : Larry Eccleston et al.

It is certified that error appears in the above-identified patent and that said Letters Patent is hereby corrected as shown below:

Column 23, line 51:
"into the out of" should be -- into and out of --.

Column 24, line 65:
"high leve," should be -- high level --.

Column 25, lines 49 and 50:
"diruptions" should be -- disruptions --.

Column 25, line 63:
"difference" should be -- different --.

Column 30, line 28:
"gate" should be -- gates --.

Column 34, line 6:
"claim 57" should be -- claim 58 --.

Signed and Sealed this

Eighth Day of September, 1987

*Attest:*

DONALD J. QUIGG

*Attesting Officer* *Commissioner of Patents and Trademarks*